United States Patent
Zhang et al.

(10) Patent No.: US 12,489,294 B1
(45) Date of Patent: Dec. 2, 2025

(54) REACTIVE POWER OPTIMIZATION METHOD FOR POWER SYSTEM BASED ON DISTRIBUTED INTERVAL OPTIMIZATION, AND COMPUTER MEDIUM

(71) Applicant: HUNAN UNIVERSITY, Changsha (CN)

(72) Inventors: Cong Zhang, Changsha (CN); Qian Liu, Changsha (CN); Jiayong Li, Changsha (CN); Dapeng Wang, Changsha (CN); Huaizhi Yang, Changsha (CN); Zhikang Shuai, Changsha (CN); Lipeng Zhu, Changsha (CN); Bin Zhou, Changsha (CN); Bingxu Li, Changsha (CN)

(73) Assignee: HUNAN UNIVERSITY, Hunan (CN)

( * ) Notice: Subject to any disclaimer, the term of this patent is extended or adjusted under 35 U.S.C. 154(b) by 0 days.

(21) Appl. No.: 19/214,140

(22) Filed: May 21, 2025

(30) Foreign Application Priority Data

Dec. 19, 2024 (CN) .......................... 202411876105.3

(51) Int. Cl.
*H02J 3/18* (2006.01)
*H02J 3/38* (2006.01)

(52) U.S. Cl.
CPC .................. *H02J 3/18* (2013.01); *H02J 3/38* (2013.01); *H02J 2203/20* (2020.01); *H02J 2300/20* (2020.01)

(58) Field of Classification Search
CPC .. H02J 3/18; H02J 3/38; H02J 2203/20; H02J 2300/20
See application file for complete search history.

(56) References Cited

U.S. PATENT DOCUMENTS 10,296,988 B2 * 5/2019 Mitra .................... G06Q 50/06
2021/0344196 A1 * 11/2021 Wang ................... G05B 13/042

FOREIGN PATENT DOCUMENTS

| CN | 107123994 A | 9/2017 |
| CN | 108521131 A | 9/2018 |

(Continued)

OTHER PUBLICATIONS

Zhang Cong, Models and Algorithms of Reactive Power Optimization Considering Uncertainties Based on Interval Theory, South China University of Technology, 2018, pp. 1-155.

(Continued)

*Primary Examiner* — Charles Cai
(74) *Attorney, Agent, or Firm* — Ming Jiang; OPENPTO US LLC

(57) ABSTRACT

The provided is a reactive power optimization method for a power system based on distributed interval optimization, including following steps: S1. constructing a first model, where the first model includes an interval reactive power optimization model of a power system with a high renewable energy penetration rate, and the interval reactive power optimization model includes an objective function, a first constraint, and a constraint of an interval power flow equation; S2. obtaining a first state variable interval based on the constraint of interval power flow equation and a distributed interval power flow algorithm; S3. Converting the first model based on the first state variable interval and a security limit definition method, and obtaining a second model, where the second model includes a deterministic optimization model; and S4. obtaining a voltage and reactive power control strategy based on the second model and a primal-dual interior point method.

14 Claims, 3 Drawing Sheets

(56) References Cited

FOREIGN PATENT DOCUMENTS

| CN | 112510714 A | 3/2021 |
|---|---|---|
| CN | 115800299 A | 3/2023 |
| CN | 117375068 A | 1/2024 |

OTHER PUBLICATIONS

Ao Chang-Ping, Optimization of Reactive Power in Power System Based on Primal-dual Interior Point Algorithm, Journal of Nanchang Hangkong University(Natural Sciences), 2010, pp. 15-20, vol. 24, No. 1.

Wang Chaoqun, et al., Constrained Power Flow Based on Interval Uncertainty, Automation of Electric Power Systems, 2015, pp. 72-77, vol. 39, No. 20.

Wu Xiaomei, et al., Study on Random Reactive Power Optimization Flow of the Power System Considering Wind Power Generation, Guangdong Electric Power, 2013, pp. 33-38+64, vol. 26, No. 4.

* cited by examiner

REACTIVE POWER OPTIMIZATION METHOD FOR POWER SYSTEM BASED ON DISTRIBUTED INTERVAL OPTIMIZATION, AND COMPUTER MEDIUM

CROSS-REFERENCE TO THE RELATED APPLICATIONS

This application is based upon and claims priority to Chinese Patent Application No. 202411876105.3, filed on Dec. 19, 2024, the entire contents of which are incorporated herein by reference.

TECHNICAL FIELD

The present disclosure relates to the field of power system optimization, and in particular to a reactive power optimization method for a power system based on distributed interval optimization, and a computer medium.

BACKGROUND

Reactive power optimization in a power system plays a crucial role in ensuring grid safety, improving voltage quality, and reducing an electric energy loss. In recent years, large-scale grid connection of renewable energy such as wind power and photovoltaics has brought a strong uncertainty to the power system due to volatility and intermittency of the renewable energy. In addition, frequent electricity trading and diversification of electricity loads have further enhanced the uncertainty in the power system. This growing uncertainty makes the reactive power optimization in the power system more complex and uncertain.

Traditional reactive power optimization methods are mostly based on deterministic optimization models in which system parameters are assumed to be known and determined, and are difficult to be applied to a power system in a current background. Therefore, an increasing number of scholars are introducing an uncertain optimization method into the reactive power optimization in the power system, forming three main types of uncertain reactive power optimization methods: a stochastic programming method, a robust optimization method, and an interval optimization method. In the stochastic programming method, an uncertain parameter is treated as a random variable that follows a specific distribution, thereby converting a reactive power optimization model into an expected model or a chance-constrained programming model. Through this approach, a voltage and reactive power control scheme that meets a constraint and an optimization objective at a specified confidence coefficient can be obtained. However, the stochastic programming method requires probability distribution information of uncertain data and needs to generate a large number of scenarios through historical data statistics or empirical models, which results in a rough modeling process and low computational efficiency, and cannot guarantee safety of grid voltage in an uncertain environment. The robust optimization method does not assume the probability distribution of the uncertain data. Instead, based on a given uncertain set, the robust optimization method seeks an optimization scheme that can meet a constraint in all scenarios. Although the robust optimization method typically yields a conservative scheme capable of addressing all uncertainties in the uncertain set, thereby avoiding complexity of the stochastic programming method in modeling and computation time and enhancing practical feasibility of the scheme, but demonstrates weak economical efficiency. Additionally, the reactive power optimization belongs to a non-convex problem. However, the robust optimization method can only be used for convex optimization and requires approximation processing, which may introduce a given approximation error.

In the interval optimization method, the uncertain data is represented as an interval to establish an interval optimization model. In the interval optimization model, a state variable is represented as an interval, a control variable is a real number, and a control variable that makes the state variable meet a constraint and achieves an optimal objective function is sought. The interval optimization method achieves simple modeling and does not require approximate convexification. In addition, an obtained strategy can theoretically ensure system safety. Existing interval optimization methods include: an intelligent algorithm solving method which uses a genetic algorithm, a particle swarm optimization algorithm, and the like for optimization to obtain an optimal control variable; an approximate optimization method which adopts interval Taylor expansion for interval reactive power optimization, and constructs a linear or quadratic programming-based interval reactive power optimization model to reduce solving difficulty; and other conversion methods, for example, a security limit definition method is used to convert an interval model into a deterministic model for solving. When processing a state variable in a model, the existing interval optimization methods all use an interval power flow algorithm to solve an interval power flow equation and obtain a state variable interval. It can be seen that the solving of the interval power flow equation plays a crucial role in processing of the reactive power optimization model. However, an interval power flow solution obtained by the existing interval power flow algorithm is generally conservative. Because an extreme scenario with an extremely low occurrence probability is considered, the interval power flow solution deviates from a true range and has little engineering significance. Additionally, an interval reactive power optimization strategy obtained in this situation also has poor economical efficiency.

Therefore, there is an urgent need for a new technical solution to resolve the technical problems to improve the accuracy, practicality, and economical efficiency of reactive power optimization methods for a power system with a high renewable energy penetration rate.

SUMMARY

The present disclosure provides a reactive power optimization method for a power system based on distributed interval optimization, and a computer medium, to resolve a technical problem of how to improve accuracy, practicality, and economical efficiency of a reactive power optimization method for a power system with a high renewable energy penetration rate.

To achieve the above objective, the present disclosure provides a reactive power optimization method for a power system based on distributed interval optimization, including following steps:

S1. constructing a first model, where the first model includes an interval reactive power optimization model of a power system with a high renewable energy penetration rate, and the interval reactive power optimization model includes an objective function, a first constraint, and a constraint of an interval power flow equation;

S2. obtaining a first state variable interval based on the constraint of the interval power flow equation and a distributed interval power flow algorithm;

S3. converting the first model based on the first state variable interval and a security limit definition method, and obtaining a second model, where the second model includes a deterministic optimization model; and S4. obtaining a voltage and reactive power control strategy based on the second model and a primal-dual interior point method.

Preferably, the objective function includes:

taking a network loss of the system as the objective function, including:

$$\min P_{loss} = \sum_{i \in S} \sum_{j \in S} V_i V_j G_{ij} \cos \theta_{ij}$$

where S represents a set of all buses in the system; i and j respectively represent a bus i and a bus j; $V_i$ and $V_j$ respectively represent voltage amplitudes of the bus i and the bus j; $G_{ij}$ represents a real part of a system bus admittance matrix; and $\theta_{ij} = \theta_i - \theta_j$, wherein $\theta_i$ and $\theta_j$ respectively represent voltage phase angles of the bus i and the bus j.

Preferably, the constraint of the interval power flow equation includes:

$$s.t. \begin{cases} \hat{P}_{Gi} - P_{Li} - V_i \sum_{j \in S} V_j (G_{ij} \cos \theta_{ij} + B_{ij} \sin \theta_{ij}) = 0, i \in S_G \\ P_{Gi} - P_{Li} - V_i \sum_{j \in S} V_j (G_{ij} \cos \theta_{ij} + B_{ij} \sin \theta_{ij}) = 0, i \in S_{Gs} \\ Q_{Gi} - Q_{Li} - V_i \sum_{j \in S} V_j (G_{ij} \sin \theta_{ij} - B_{ij} \cos \theta_{ij}) = 0, i \in S_G \cup S_{Gs} \\ -\hat{P}_{Li} - V_i \sum_{j \in S} V_j (G_{ij} \cos \theta_{ij} + B_{ij} \sin \theta_{ij}) = 0, i \in S_L \\ Q_{Ci} - \hat{Q}_{Li} - V_i \sum_{j \in S} V_j (G_{ij} \sin \theta_{ij} - B_{ij} \cos \theta_{ij}) = 0, i \in S_L \\ \theta_{ij} = \theta_i - \theta_j \end{cases}$$

where $B_{ij}$ represents an imaginary part of the system bus admittance matrix; $\hat{P}_{Gi}$ represents an active power generation interval $\hat{P}_{Gi} = [P_{Gi}^L, P_{Gi}^U]$ of a renewable energy unit; $P_{Gi}^L$ and $P_{Gi}^U$ respectively represent a lower boundary and an upper boundary of the active power generation interval of the renewable energy unit; $S_G$ represents a generator bus excluding a slack bus; $S_{Gs}$ represents the slack bus, where the system usually includes one slack bus; when $i \in S_G$, $P_{Li}$ represents an active load of the generator bus excluding the slack bus; when $i \in S_{Gs}$, $P_{Li}$ represents an active load of the slack bus; $P_{Gi}$ represents an active power generation of a slack bus; when $i \in S_G$, $Q_{Gi}$ and $Q_{Li}$ respectively represent a reactive power generation and a reactive load of the generator bus excluding the slack bus; when $i \in S_{Gs}$, $Q_{Gi}$ and $Q_{Li}$ respectively represent a reactive power generation and a reactive load of the slack bus; the active load and the reactive load of the slack bus, as well as the active load and the reactive load of the generator bus are deterministic data; $\hat{P}_{Li}$ and $\hat{Q}_{Li}$ respectively represent an active load interval $\hat{P}_{Li} = [P_{Li}^L, P_{Li}^U]$ and a reactive load interval $\hat{Q}_{Li} = [Q_{Li}^L, Q_{Li}^U]$ of a load bus i; $P_{Li}^L$ and $P_{Li}^U$ respectively represent a lower boundary and an upper boundary of an active load interval of a load bus; $Q_{Li}^L$ and $Q_{Li}^U$ respectively represent a lower boundary and an upper boundary of a reactive load interval of the load bus; $S_L$ represents the load bus; and $Q_{Ci}$ represents a reactive power compensation capacity of the bus i.

Preferably, the first constraint includes:

$$s.t. \begin{cases} V_i^{min} \le V_i \le V_i^{max}, i \in S_G \cup S_L \\ P_{Gi}^{min} \le P_{Gi} \le P_{Gi}^{max}, i \in S_{Gs} \\ Q_{Gi}^{min} \le Q_{Gi} \le Q_{Gi}^{max}, i \in S_G \cup S_{Gs} \\ T_l^{min} \le T_l \le T_l^{max}, l \in S_T \\ Q_{Ci}^{min} \le Q_{Ci} \le Q_{Ci}^{max}, i \in S_C \end{cases}$$

where $V_i^{min}$ and $V_i^{max}$ respectively represent a lower limit and an upper limit of an amplitude of a bus voltage; $P_{Gi}^{min}$ and $P_{Gi}^{max}$ respectively represent a lower limit and an upper limit of the active power generation of the slack bus; when $i \in S_G$, $Q_{Gi}^{min}$ and $Q_{Gi}^{max}$ respectively represent a lower limit and an upper limit of the reactive power generation of the generator bus excluding the slack bus; when $i \in S_{Gs}$, $Q_{Gi}^{min}$ and $Q_{Gi}^{max}$ respectively represent a lower limit and an upper limit of the reactive power generation of the slack bus; $T_l$ represents a transformer transformation ratio; $T_l^{min}$ and $T_l^{max}$ respectively represent a lower limit and an upper limit of the transformer transformation ratio; $S_T$ represents a transformer branch; $Q_{Ci}^{min}$ and $Q_{Ci}^{max}$ respectively represent a lower limit and an upper limit of the reactive power compensation capacity; and $S_C$ represents a reactive power compensation bus.

Preferably, the S2 includes:

processing the constraint of the interval power flow equation based on the distributed interval power flow algorithm;

assuming that a total quantity of buses in the system is n, and a total quantity of generator buses excluding the slack bus is r, representing a state variable $V_i$, a state variable $\theta_i$, and a state variable $Q_{Gi}$ in the constraint of the interval power flow equation as affine forms, where a first affine expression for the state variable $V_i$, a first affine expression for the state variable $\theta_i$, and a first affine expression for the state variable $Q_{Gi}$ include:

$$V_i = V_i^0 + \sum_{j=2}^{n} V_{i,j}^P \varepsilon_{j1}^P + \sum_{j=r+2}^{n} V_{i,j}^Q \varepsilon_{j1}^Q, i \in S_L$$

$$\theta_i = \theta_i^0 + \sum_{j=2}^{n} \theta_{i,j}^P \varepsilon_{j2}^P + \sum_{j=r+2}^{n} \theta_{i,j}^Q \varepsilon_{j2}^Q, i \in S_G \cup S_L$$

$$Q_{Gi} = Q_{Gi}^0 + \sum_{j=2}^{n} Q_{Gi,j}^P \varepsilon_{j3}^P + \sum_{j=r+2}^{n} Q_{Gi,j}^Q \varepsilon_{j3}^Q, i \in S_G$$

where $V_i^0$, $\theta_i^0$, and $Q_{Gi}^0$ respectively represent interval midpoints of the $V_i$, the $\theta_i$, and the $Q_{Gi}$, and can be obtained by solving a power flow equation at a midpoint of a power injection interval of the system; $\varepsilon_{j1}^P$, $\varepsilon_{j1}^Q$, $\varepsilon_{j2}^P$, $\varepsilon_{j2}^Q$, $\varepsilon_{j3}^P$, and $\varepsilon_{j3}^Q$ represent affine noise elements whose value ranges are all $[-1,1]$; and $V_{i,j}^P$, $V_{i,j}^Q$, $\theta_{i,j}^P$, $\theta_{i,j}^Q$, $Q_{Gi,j}^P$, and $Q_{Gi,j}^Q$ represent sensitivity coefficients;

establishing a third model based on the first affine expressions, where the third model includes an optimizing-scenarios model of the constraint of the interval power flow equation, including:

min(max)$V_i, \theta_i, Q_{Gi}$;

s.t.
$$\begin{cases} P_{Gi}^L \le P_{Li} + V_i \sum_{j \in S} V_j(G_{ij}\cos\theta_{ij} + B_{ij}\sin\theta_{ij}) \le P_{Gi}^U, i \in S_G \\ P_{Li}^L \le -V_i \sum_{j \in S} V_j(G_{ij}\cos\theta_{ij} + B_{ij}\sin\theta_{ij}) \le P_{Li}^U, i \in S_L \\ Q_{Li}^L \le Q_{Ci} - V_i \sum_{j \in S} V_j(G_{ij}\sin\theta_{ij} - B_{ij}\cos\theta_{ij}) \le Q_{Li}^U, i \in S_L \\ Q_{Gi} - Q_{Li} - V_i \sum_{j \in S} V_j(G_{ij}\sin\theta_{ij} - B_{ij}\cos\theta_{ij}) = 0, i \in S_G \\ V_i = V_i^0 + \sum_{j=2}^{n} V_{i,j}^P \varepsilon_{j1}^P + \sum_{j=r+2}^{n} V_{i,j}^Q \varepsilon_{j1}^Q, i \in S_L \\ \theta_i = \theta_i^0 + \sum_{j=2}^{n} \theta_{i,j}^P \varepsilon_{j2}^P + \sum_{j=r+2}^{n} \theta_{i,j}^Q \varepsilon_{j2}^Q, i \in S_G \cup S_L \\ Q_{Gi} = Q_{Gi}^0 + \sum_{j=2}^{n} Q_{Gi,j}^P \varepsilon_{j3}^P + \sum_{j=r+2}^{n} Q_{Gi,j}^Q \varepsilon_{j3}^Q, i \in S_G \\ -1 \le \varepsilon_{jx}^P, \varepsilon_{jx}^Q \le 1, x \in (1, 2, 3) \end{cases}$$

solving the third model by using an interior point method, obtaining maximum values $\varepsilon_{j1,max}^P$, $\varepsilon_{j1,max}^Q$, $\varepsilon_{j2,max}^P$, $\varepsilon_{j2,max}^Q$, $\varepsilon_{j3,max}^P$, $\varepsilon_{j3,max}^Q$ and minimum values $\varepsilon_{j1,min}^P$, $\varepsilon_{j1,min}^Q$, $\varepsilon_{j2,min}^P$, $\varepsilon_{j2,min}^Q$, $\varepsilon_{j3,min}^P$, $\varepsilon_{j3,min}^Q$ of the affine noise elements, and then obtaining a high-precision affine expression for the state variable, in other words, obtaining a second affine expression for the state variable $V_i$, a second affine expression for the state variable $\theta_i$, and a second affine expression for the state variable $Q_{Gi}$:

$$V_i = V_i^0 + \sum_{j=2}^{n} V_{i,j}^P [\varepsilon_{j1,min}^P, \varepsilon_{j1,max}^P] + \sum_{j=r+2}^{n} V_{i,j}^Q [\varepsilon_{j1,min}^Q, \varepsilon_{j1,max}^Q], i \in S_L$$

$$\theta_i = \theta_i^0 + \sum_{j=2}^{n} \theta_{i,j}^P [\varepsilon_{j2,min}^P, \varepsilon_{j2,max}^P] + \sum_{j=r+2}^{n} \theta_{i,j}^Q [\varepsilon_{j2,min}^Q, \varepsilon_{j2,max}^Q], i \in S_G \cup S_L$$

$$Q_{Gi} = Q_{Gi}^0 + \sum_{j=2}^{n} Q_{Gi,j}^P [\varepsilon_{j3,min}^P, \varepsilon_{j3,max}^P] + \sum_{j=r+2}^{n} Q_{Gi,j}^Q [\varepsilon_{j3,min}^Q, \varepsilon_{j3,max}^Q], i \in S_G$$

where for an affine expression of an interval, if noise element variables $\varepsilon_{jx}^P$ and $\varepsilon_{jx}^Q$ follow a uniform distribution within the interval, the second affine expression can be considered as a superposition of a series of uniform distributions, each term in each expression is independent, that is, a central limit theorem is satisfied, and values of the $V_i$, the $\theta_i$, and the $Q_{Gi}$ approximately follow a normal distribution; and based on a property of the uniform distribution, a variance of each term in the second affine expression is obtained, including:

$$\sigma_{V,j}^{P(Q)} = \frac{(V_{i,j}^{P(Q)} \varepsilon_{j1,max}^{P(Q)} - V_{i,j}^{P(Q)} \varepsilon_{j1,min}^{P(Q)})^2}{12}$$

$$\sigma_{\theta,j}^{P(Q)} = \frac{(\theta_{i,j}^{P(Q)} \varepsilon_{j2,max}^{P(Q)} - \theta_{i,j}^{P(Q)} \varepsilon_{j2,min}^{P(Q)})^2}{12}$$

$$\sigma_{Q,j}^{P(Q)} = \frac{(Q_{Gi,j}^{(P)Q} \varepsilon_{j3,max}^{P(Q)} - Q_{Gi,j}^{(P)Q} \varepsilon_{j3,min}^{P(Q)})^2}{12}$$

where P(Q) represents choosing either P or Q;
obtaining standard deviations of the state variable $V_i$, the state variable $\theta_i$, and the state variable $Q_{Gi}$ based on the variance:

$$\sigma_{V,i} = \sqrt{\sum_{j=2}^{n} \sigma_{V,j}^P + \sum_{j=r+2}^{n} \sigma_{V,j}^Q}$$

$$\sigma_{\theta,i} = \sqrt{\sum_{j=2}^{n} \sigma_{\theta,j}^P + \sum_{j=r+2}^{n} \sigma_{\theta,j}^Q}$$

$$\sigma_{Q,i} = \sqrt{\sum_{j=2}^{n} \sigma_{Q,j}^P + \sum_{j=r+2}^{n} \sigma_{Q,j}^Q},$$

and
because the values of the $V_i$, the $\theta_i$, and the $Q_{Gi}$ approximately follow the normal distribution, obtaining a confidence interval with a confidence coefficient of 0.9973 for the state variable based on the property of the normal distribution:

$V_i = [V_i^0 - 3\sigma_{V,i}, V_i^0 + 3\sigma_{V,i}]$ $\theta_i = [\theta_i^0 - 3\sigma_{\theta,i}, \theta_i^0 + 3\sigma_{\theta,i}]$ $Q_{Gi} = [Q_{Gi}^0 - 3\sigma_{Q,i}, Q_{Gi}^0 + 3\sigma_{Q,i}]$ that is, obtaining the first state variable interval.

Preferably, the reactive power optimization method further includes:
solving the sensitivity coefficients, including:

$$V_{i,j}^P = \frac{\partial V_i}{\partial P_j}\bigg|_0 \Delta P_j, \theta_{i,j}^P = \frac{\partial \theta_i}{\partial P_j}\bigg|_0 \Delta P_j, Q_{Gi,j}^P = \frac{\partial Q_{Gi}}{\partial P_j}\bigg|_0 \Delta P_j, j \in S_G \cup S_L$$

$$V_{i,j}^Q = \frac{\partial V_i}{\partial Q_j}\bigg|_0 \Delta Q_j, \theta_{i,j}^Q = \frac{\partial \theta_i}{\partial Q_j}\bigg|_0 \Delta Q_j, Q_{Gi,j}^Q = \frac{\partial Q_{Gi}}{\partial Q_j}\bigg|_0 \Delta Q_j, j \in S_L$$

where $\frac{\partial V_i}{\partial P_j}\big|_0, \frac{\partial V_i}{\partial Q_j}\big|_0, \frac{\partial \theta_i}{\partial P_j}\big|_0, \frac{\partial \theta_i}{\partial Q_j}\big|_0, \frac{\partial Q_{Gi}}{\partial P_j}\big|_0,$ and $\frac{\partial Q_{Gi}}{\partial Q_j}\big|_0$ respectively represent partial derivatives of all variables at a value 0, and can be obtained at a power flow solution at the midpoint of the power injection interval; $\Delta P_j$ and $\Delta Q_j$ respectively represent radii of an active power injection interval and a reactive power injection interval, where $\Delta P_j=(P_{Gj}^U-P_{Gj}^L)/2$, $j\in S_G$, and $P_{Gj}^U$ and $P_{Gj}^L$ respectively represent an upper limit and a lower limit of an active power generation interval of the generator bus; $\Delta P_j=(P_{Lj}^U-P_{Lj}^L)/2$, $j\in S_L$, where $P_{Lj}^U$ and $P_{Lj}^L$ respectively represent an upper limit and a lower limit of an active load demand interval of the load bus; and $\Delta Q_j=(Q_{Lj}^U-Q_{Lj}^L)/2$, $j\in S_L$, where $Q_{Lj}^U$ and $Q_{Lj}^L$ respectively represent an upper limit and a lower limit of a reactive load demand interval of the load bus.

Preferably, the S3 includes:

since each inequality constraint in the first model is a univariate constraint, representing a variable, an objective function, and a constraint in the first model by using a vector and a function, such that the first model can be represented as a compact model:

$$\min f(X,u)=[f^L, f^U]$$

$$s.t. \begin{cases} h(X, u) = [h^L, h^U] \\ X_1^{min} \le X_1 \le X_1^{max} \\ u^{min} \le u \le u^{max} \end{cases}$$

where $f(X,u)$ represents the network loss of the system; $[f^L, f_U]$ represents an interval form of a network loss; $h(X,u)$ represents the constraint of the interval power flow equation; $[h^L,h^U]$ represents a vector of power injection intervals of buses; X represents the first state variable interval; u represents a vector of control variables; $X_1$ represents a vector constituted by a voltage of the load bus and a reactive power generation of a generator, where $X_1^{min}$ and $X_1^{max}$ respectively represent a minimum value and a maximum value of the $X_1$, and $u^{min}$ $u^{max}$ respectively represent a minimum value and a maximum value of the vector of control variables u; T represents transposition; and if a voltage phase angle of a bus other than the slack bus and an active power generation of the slack bus are represented as a vector $X_2$, a vector of state variables of the system can be represented as $X=[X_1^T, X_2^T]^T$;

in the compact model, for any vector of control variables u, solving the interval power flow equation $h(X,u)=[h^L, h^U]$ based on the distributed interval power flow algorithm, and obtaining the corresponding X, where due to a boundary of the u, there is a vector of control variables $u^i$ that maximizes an interval radius of one $X_i$ of the X, which is denoted as $X_i^{max}$, and each $X_i^{max}$ has one corresponding $u^i$; and therefore, defining a maximum radius $\Delta X_i^{max}$ of the $X_i$:

$$\Delta X_i^{max} = \max_{u^{min} \le u \le u^{max}} \{\Delta X_i | h(X, u) = [h^L, h^U]\}$$

where $\Delta X_i$ represents an interval radius of the state variable $X_i$;

obtaining a vector $\Delta X_1^{max}$ constituted by maximum interval radii of all variables in $X_1$ through Monte Carlo simulation, where for a same vector of control variables u, the X represents a solution of the interval power flow equation $h(X,u)=[h^L,h^U]$, x represents a solution of a deterministic power flow equation $h(X,u)=\xi$, $\xi=[h^L,$ $h^U]$, and considering that a deterministic state variable is probably located at any position within a maximum state variable interval in the Monte Carlo simulation, and a maximum radius of a state variable interval corresponding to a deterministic state variable $x_1$ is $\Delta X_1^{max}$, there is a constraint $X_1^{min} \le [x_1-2\Delta X_1^{max}, x_1+2\Delta X_1^{max}] \le X_1^{max}$ to ensure that the $X_1$ meets a constraint in the compact model; and therefore, defining an absolute security limit, including:

$$AX_1^{min}=X_1^{min}+2\Delta X_1^{max}$$

$$AX_1^{max}=X_1^{min}+2\Delta X_1^{max}$$

because the absolute security limit represents a security boundary in a worst-case scenario and is strongly conservative, introducing an average position ratio $k^I$ to correct a security limit to reduce conservatism of the security limit:

$$k^I = \frac{x_0 - \underline{X_0}}{\overline{X_0} - \underline{X_0}}$$

where $x_0$ represents a deterministic state variable when the vector of control variables u is in $u_0=(u^{min}+u^{max})/2$ and a scenario $\xi$ is in $\xi_0=(h^L+h^U)/2$; $\underline{X_0}$ and $\overline{X^0}$ respectively represent a lower boundary and an upper boundary of a state variable interval obtained by solving the interval power flow equation $h(X,u)=[h^L, h^U]$ at the $u_0=(u^{min}+u^{max})/2$; and assuming that a corresponding average position ratio of the $X_1$ is $k_1^I$, and $0 \le k_1^I \le 1$, a corrected security limit can be represented by a following relational expression:

$$MX_1^{min}=X_1^{min}+2k_1^I\Delta X_1^{max}$$

$$MX_1^{max}=X_1^{max}+2(1-k_1^I)\Delta X_1^{max}$$

because the average position ratio $k^I$ is defined at a midpoint of the control variable, while the control variable generally takes any value within a control variable interval, resulting in deviation of the X from $[\underline{X_0}, \overline{X^0}]$, there is a security error in the corrected security limit, and the state variable may exceed a limit; therefore, precisely correcting the state variable by taking an amplitude of the state variable $X_1$ exceeding an upper limit as $\delta_u X_1$ and an amplitude of the state variable $X_1$ exceeding a lower limit as $\delta_l X_1$, including:

$$MX_1^{min}=MX_1^{min}+\delta_l X_1$$

$$MX_1^{max}=MX_1^{max}+\delta_u X_1$$

if a precisely corrected state variable is still in an out-of-limit state, precisely correcting the precisely corrected state variable until a corrected state variable does not exceed the limit, and obtaining a final security limit; and converting the compact model into the second model based on the final security limit, where the second model can be represented by a following relational expression:

$$\min f(x,u)$$

$$s.t. \begin{cases} h(x, u) = \xi \\ MX_1^{min} \le x_1 \le MX_1^{max} \\ u^{min} \le u \le u^{max} \end{cases}$$

where $\xi$ represents any scenario in the $[h^L,h^U]$.

Preferably, the S4 includes:

solving the second model by using the primal-dual interior point method;

for the second model, introducing a Lagrange multiplier $\lambda$ and dual variables $v_1$, $v_2$, $\eta_1$, and $\eta_2$ to construct a Lagrange function L that can be represented by a following relational expression:

$L(x,u,\lambda,v_1,v_2,\eta_1,\eta_2)=f(x,u)+\lambda^T(h(x,u)-\xi)+v_1^T(x_1-MX_1^{min})+v_2^T(MX_1^{max}-x_1)+\eta_1^T(u-u^{min})+\eta_2^T(u^{max}-u)$ establishing a Karush-Kuhn-Tucker (KKT) condition for the Lagrange function, where the KKT condition includes a gradient condition, a primal feasibility condition, a dual feasibility condition, and a complementary relaxation condition, and can be represented by a following relational expression:

$$\begin{cases} \nabla_x L(x, u, \lambda, v_1, v_2) = \nabla_x f(x, u) + \lambda^T \nabla_x h(x, u) + v_1^T - v_2^T = 0 \\ \nabla_u L(x, u, \lambda, \eta_1, \eta_2) = \nabla_u f(x, u) + \lambda^T \nabla_u h(x, u) + \eta_1^T - \eta_2^T = 0 \\ \nabla_\lambda L(x, u, \lambda) = h(x, u) - \xi = 0 \\ MX_1^{min} \le x_1 \le MX_1^{max} \\ u^{min} \le u \le u^{max} \\ v_1, v_2, \eta_1, \eta_2 \ge 0 \\ v_1^T(x_1 - MX_1^{min}) = 0 \\ v_2^T(MX_1^{max} - x_1) = 0 \\ \eta_1^T(u - u^{min}) = 0 \\ \eta_2^T(u^{max} - u) = 0 \end{cases}$$

solving the KKT condition through Newton gradient descent, including:

selecting an initial point $(x_0, u_0, \lambda_0, v_1^0, v_2^0, \eta_1^0, \eta_2^0)$ to ensure that the inequality constraint is met; and in a $k^{th}$ iteration, obtaining a Newton gradient descent equation based on current $(x_k, u_k, \lambda_k, v_1^k, v_2^k, \eta_1^k, \eta_2^k)$, where the Newton gradient descent equation can be represented by a following relational expression:

$H\Delta z = -\nabla L(z_k)$ where H represents a Hessian matrix of the Lagrange function; $\Delta z$ represents a Newton step, including $\Delta x$, $\Delta u$, $\Delta \lambda$, $\Delta v_1$, $\Delta v_2$, $\Delta \eta_1$ and $\Delta \eta_2$; $\nabla L(z_k)$ represents a current gradient; and $\alpha$ is set as a step size, and a Newton step variable updating scheme is obtained and can be represented by a following relational expression:

$z_{k+1} = z_K + \alpha \Delta z$ where $z_k$ represents a vector constituted by a variable in the $k^{th}$ iteration, including $x_k, u_k, \lambda_k, v_1^k, v_2^k, \eta_1^k, \eta_2^k$; and $z_{k+1}$ represents a variable vector in a $(k+1)^{th}$ iteration, including $x_{k+1}, u_{k+1}, \lambda_{k+1}, v_1^{k+1}, v_2^{k+1}, \eta_1^{k+1}, \eta_2^{k+1}$; and determining whether a convergence condition is met, and if the convergence condition is met, determining that the Newton gradient descent converges, stopping an iteration, and outputting a solving result $(x^*, u^*, \lambda^*, v_1^*, v_2^*, \eta_1^*, \eta_2^*)$ of the second model, that is, obtaining the voltage and reactive power control strategy, where the convergence condition includes that a duality gap Duality Gap=$v_1(x_1-MX_1^{min})+v_2(MX_1^{max}-x_1)+\eta_1(u-u^{min})+\eta_2(u^{max}-u)$ is less than a convergence tolerance, and the primal feasibility condition, the dual feasibility condition, and the complementary relaxation condition are all met.

Preferably, the reactive power optimization method further includes:

calculating a distributed interval power flow based on the voltage and reactive power control strategy, and obtaining a vector of control variables u* and a corresponding second state variable interval X*, including:

obtaining a distributed interval power flow model under the vector of control variables u* based on the vector of control variables u*, where the vector of control variables u* in the voltage and reactive power control strategy, namely, the solving result $(x^*, u^*, \lambda^*, v_1^*, v_2^*, \eta_1^*, \eta_2^*)$, includes a final transformer transformation ratio $T_l^*$, a generator terminal voltage $V_i^*$ ($i \in S_G$), and the reactive power compensation capacity $Q_{Ci}^*$; and the distributed interval power flow model can be represented by a following relational expression:

$\min(\max) V_i, \theta_i, Q_{Gi}$ s.t. $\begin{cases} P_{Gi}^L \le P_{Li} + V_i^* \sum_{j \in S} V_j(G_{ij}^* \cos\theta_{ij} + B_{ij}^* \sin\theta_{ij}) \le P_{Gi}^U, i \in S_G \\ P_{Li}^L \le -V_i \sum_{j \in S} V_j(G_{ij}^* \cos\theta_{ij} + B_{ij}^* \sin\theta_{ij}) \le P_{Li}^U, i \in S_L \\ Q_{Li}^L \le Q_{Ci}^* - V_i \sum_{j \in S} V_j(G_{ij}^* \sin\theta_{ij} - B_{ij}^* \cos\theta_{ij}) \le Q_{Li}^U, i \in S_L \\ Q_{Gi} - Q_{Li} - V_i^* \sum_{j \in S} V_j(G_{ij}^* \sin\theta_{ij} - B_{ij}^* \cos\theta_{ij}) = 0, i \in S_G \\ V_i = V_i^0 + \sum_{j=2}^{n} V_{i,j}^P \varepsilon_{j1}^P + \sum_{j=r+2}^{n} V_{i,j}^Q \varepsilon_{j1}^Q, i \in S_L \\ \theta_i = \theta_i^0 + \sum_{j=2}^{n} \theta_{i,j}^P \varepsilon_{j2}^P + \sum_{j=r+2}^{n} \theta_{i,j}^Q \varepsilon_{j2}^Q, i \in S_G \cup S_L \\ Q_{Gi} = Q_{Gi}^0 + \sum_{j=2}^{n} Q_{Gi,j}^P \varepsilon_{j3}^P + \sum_{j=r+2}^{n} Q_{Gi,j}^Q \varepsilon_{j3}^Q, i \in S_G \\ -1 \le \varepsilon_{jx}^P, \varepsilon_{jx}^Q \le 1, x \in (1, 2, 3) \end{cases}$ where $G_{ij}^*$ and $B_{ij}^*$ respectively represent a real part and an imaginary part of a bus admittance matrix under the final transformer transformation ratio $T_l^*$; and obtaining the corresponding second state variable interval X* of the system under the u* through solving based on the distributed interval power flow model under the u* and the distributed interval power flow algorithm, where the X* includes a voltage interval $V_i^*$ of the load bus, a phase angle interval $\theta_i^*$ of the bus voltage, and a reactive power i generation interval $Q_{Gi}^*$ of the generator; and outputting the u* and the X*, in other words, obtaining the vector of control variables and the corresponding second state variable interval.

The present disclosure further provides a computer medium, including a processor, a memory, and a computer program for implementing the method in the present disclosure.

The present disclosure has following beneficial effects:

According to the reactive power optimization method for a power system based on distributed interval optimization in the present disclosure, a state variable interval obtained by processing a constraint of an interval power flow equation based on a distributed interval power flow algorithm has a high confidence coefficient. Therefore, the method can reduce conservatism of an interval algorithm and is closer to an actual range, thereby improving solving accuracy, reducing a network loss of the system, and improving economical efficiency and practicality of a voltage control strategy. An interval reactive power optimization model is converted into a deterministic optimization model by using a security limit definition method, and the deterministic optimization model is solved by using a primal-dual interior point method, such that the method in the present disclosure resolves a convergence problem of a nonlinear interval optimization algorithm and can achieve a safer and more economical interval voltage control strategy.

The present disclosure may have other objectives, features, and advantages than the objectives, features, and advantages as described above. The present disclosure will be further described below in detail with reference to accompanying drawings.

BRIEF DESCRIPTION OF THE DRAWINGS

The accompanying drawings constituting a part of the present disclosure provide further understanding of the present disclosure. Schematic embodiments of the present disclosure and description thereof are intended to illustrate the present disclosure and do not constitute an undue limitation on the present disclosure. In the accompanying drawings.

DETAILED DESCRIPTION OF THE EMBODIMENTS

Embodiments of the present disclosure are described in detail below with reference to the accompanying drawings, but the present disclosure can be implemented in a variety of different modes limited and involved by the claims.

Figure 1:
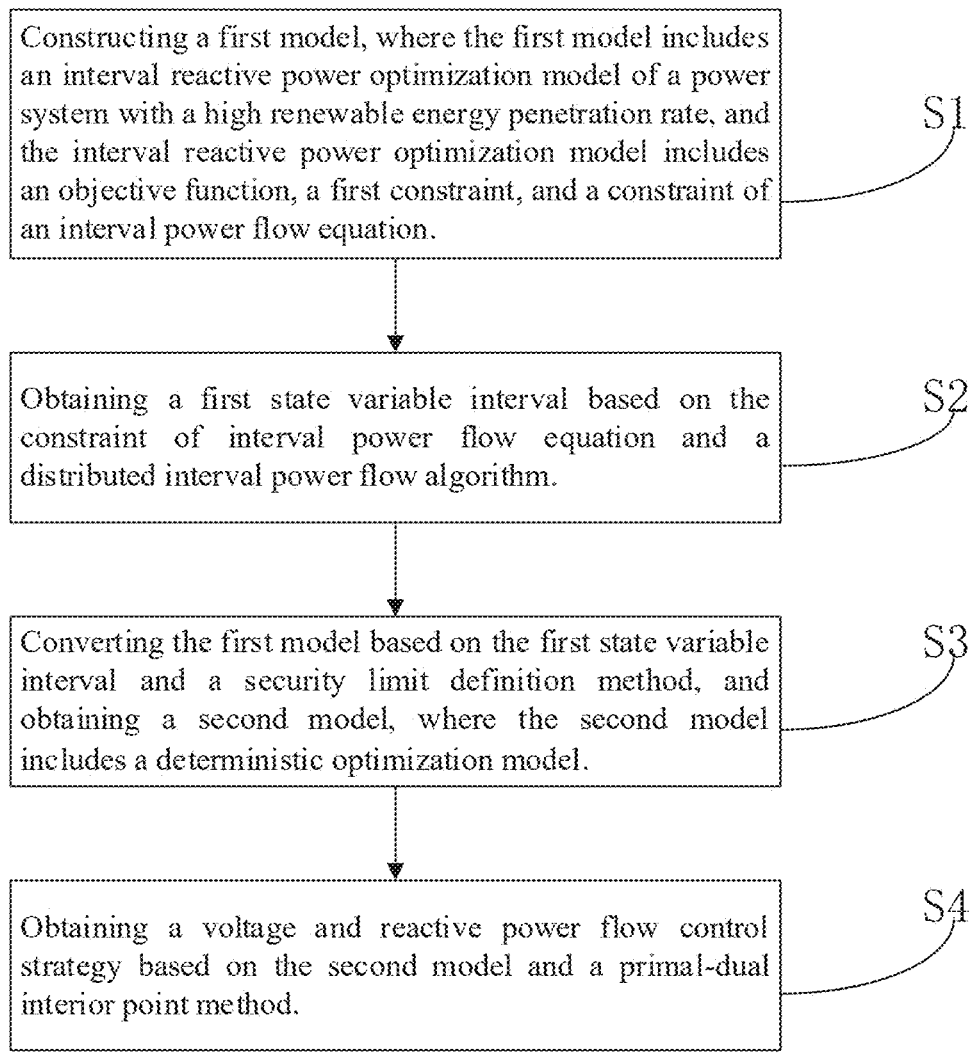
FIG. 1 is a schematic flowchart according to a preferred embodiment of the present disclosure.

Referring to FIG. 1, in a preferred embodiment of the present disclosure, a reactive power optimization method for a power system based on distributed interval optimization is provided, including following steps:

S1. A first model is constructed, where the first model includes an interval reactive power optimization model of a power system with a high renewable energy penetration rate, and the interval reactive power optimization model includes an objective function, a first constraint, and a constraint of an interval power flow equation.

In the preferred embodiment of the present disclosure, the objective function includes:

A network loss of the system is taken as the objective function, including:

$$\min P_{loss} = \sum_{i \in S} \sum_{j \in S} V_i V_j G_{ij} \cos\theta_{ij}$$

where S represents a set of all buses in the system; i and j respectively represent bus i and bus j; $V_i$ and $V_j$ respectively represent voltage amplitudes of the bus i and the bus j; $G_{ij}$ represents a real part of a system bus admittance matrix; and $\theta_{ij}=\theta_i-\theta_j$, where $\theta_i$ and $\theta_j$ respectively represent voltage phase angles of the bus i and the bus j.

In the preferred embodiment of the present disclosure, the constraint of the interval power flow equation includes:

$$s.t.\begin{cases} \hat{P}_{Gi} - P_{Li} + V_i \sum_{j \in S} V_j(G_{ij}\cos\theta_{ij} + B_{ij}\sin\theta_{ij}) = 0, i \in S_G \\ P_{Gi} - P_{Li} + V_i \sum_{j \in S} V_j(G_{ij}\cos\theta_{ij} + B_{ij}\sin\theta_{ij}) = 0, i \in S_{Gs} \\ Q_{Gi} - Q_{Li} - V_i \sum_{j \in S} V_j(G_{ij}\sin\theta_{ij} - B_{ij}\cos\theta_{ij}) = 0, i \in S_G \cup S_{Gs} \\ -\hat{P}_{Li} - V_i \sum_{j \in S} V_j(G_{ij}\cos\theta_{ij} + B_{ij}\sin\theta_{ij}) = 0, i \in S_L \\ Q_{Ci} - \hat{Q}_{Li} - V_i \sum_{j \in S} V_j(G_{ij}\sin\theta_{ij} - B_{ij}\cos\theta_{ij}) = 0, i \in S_L \\ \theta_{ij} = \theta_i - \theta_j \end{cases}$$

where $B_{ij}$ represents an imaginary part of the system bus admittance matrix; $\hat{P}_{Gi}$ represents active power generation interval $\hat{P}_{Gi}=[P_{Gi}^L, P_{Gi}^U]$ of a renewable energy unit; $P_{Gi}^L$ and $P_{Gi}^U$ respectively represent a lower boundary and an upper boundary of the active power generation interval of the renewable energy unit; $S_G$ represents a generator bus excluding a slack bus; $S_{Gs}$ represents the slack bus, where the system usually includes one slack bus; when $i \in S_G$, $P_{Li}$ represents an active load of the generator bus excluding the slack bus; when $i \in S_{Gs}$, $P_{Li}$ represents an active load of the slack bus; $P_{Gi}$ represents an active power generation of a slack bus; when $i \in S_G$, $Q_{Gi}$ and $Q_{Li}$ respectively represent a reactive power generation and a reactive load of the generator bus excluding the slack bus; when $i \in S_{Gs}$, $Q_{Gi}$ and $Q_{Li}$ respectively represent a reactive power generation and a reactive load of the slack bus; since a load of a power plant is generally relatively stable, the active load and the reactive load of the slack bus, as well as the active load and the reactive load of the generator bus are deterministic data; $\hat{P}_{Li}$ and $\hat{Q}_{Li}$ respectively represent active load interval $\hat{P}_{Li}=[P_{Li}^L, P_{Li}^U]$ and reactive load interval $\hat{Q}_{Li}=[Q_{Li}^L, Q_{Li}^U]$ of load bus i, $P_{Li}^L$ and $P_{Li}^U$ respectively represent a lower boundary and an upper boundary of an active load interval of a load bus; $Q_{Li}^L$ and $Q_{Li}^U$ respectively represent a lower boundary and an upper boundary of a reactive load interval of the load bus; $S_L$ represents the load bus; and $Q_{Ci}$ represents a reactive power compensation capacity of the bus i.

In the preferred embodiment of the present disclosure, the first constraint includes:

$$s.t.\begin{cases} V_i^{min} \le V_i \le V_i^{max}, i \in S_G \cup S_L \\ P_{Gi}^{min} \le P_{Gi} \le P_{Gi}^{max}, i \in S_{Gs} \\ Q_{Gi}^{min} \le Q_{Gi} \le Q_{Gi}^{max}, i \in S_G \cup S_{Gs} \\ T_l^{min} \le T_l \le T_l^{max}, l \in S_T \\ Q_{Ci}^{min} \le Q_{Ci} \le Q_{Ci}^{max}, i \in S_C \end{cases}$$

where $V_i^{min}$ and $V_i^{max}$ respectively represent a lower limit and an upper limit of an amplitude of a bus voltage; $P_{Gi}^{min}$ and $P_{Gi}^{max}$ respectively represent a lower limit and an upper limit of the active power generation of the slack bus; when $i \in S_G$, $Q_{Gi}^{min}$ and $Q_{Gi}^{max}$ respectively represent a lower limit and an upper limit of the reactive power generation of the generator bus excluding the slack bus; when $i \in S_{Gs}$, $Q_{Gi}^{min}$ and $Q_{Gi}^{max}$ respectively represent a lower limit and an upper limit of the reactive power generation of the slack bus; $T_l$ represents a transformer transformation ratio; $T_l^{min}$ and $T_l^{max}$ respectively represent a lower limit and an upper limit of the transformer transformation ratio; $S_T$ represents a transformer branch; $Q_{Ci}^{min}$ and $Q_{Ci}^{max}$ respectively represent a lower limit and an upper limit of the reactive power compensation capacity; and $S_C$ represents a reactive power compensation bus.

S2. A first state variable interval is obtained based on the constraint of the interval power flow equation and a distributed interval power flow algorithm. The S2 specifically includes:

The constraint of the interval power flow equation is processed based on the distributed interval power flow algorithm.

Assuming that a total quantity of buses in the system is n, and a total quantity of generator buses excluding the slack bus is r, state variable $V_i$, state variable $\theta_i$, and state variable $Q_{Gi}$ in the constraint of the interval power flow equation are represented as affine forms, where a first affine expression for the state variable $V_i$, a first affine expression for the state variable $\theta_i$, and a first affine expression for the state variable $Q_{Gi}$ include:

$$V_i = V_i^0 + \sum_{j=2}^{n} V_{i,j}^P \varepsilon_{j1}^P + \sum_{j=r+2}^{n} V_{i,j}^Q \varepsilon_{j1}^Q, \; i \in S_L$$

$$\theta_i = \theta_i^0 + \sum_{j=2}^{n} \theta_{i,j}^P \varepsilon_{j2}^P + \sum_{j=r+2}^{n} \theta_{i,j}^Q \varepsilon_{j2}^Q, \; i \in S_G \cup S_L$$

$$Q_{Gi} = Q_{Gi}^0 + \sum_{j=2}^{n} Q_{Gi,j}^P \varepsilon_{j3}^P + \sum_{j=r+2}^{n} Q_{Gi,j}^Q \varepsilon_{j3}^Q, \; i \in S_G$$

where $V_i^0$, $\theta_i^0$, and $Q_{Gi}^0$ respectively represent interval midpoints of the $V_i$, the $\theta_i$, and the $Q_{Gi}$, and can be obtained by solving a power flow equation at a midpoint of a power injection interval of the system; $\varepsilon_{j1}^P$, $\varepsilon j1^Q$, $\varepsilon_{j2}^P$, $\varepsilon_{j2}^Q$, $\varepsilon_{j3}^P$, and $\varepsilon_{j3}^Q$ represent affine noise elements whose value ranges are all $[-1,1]$; and $V_{i,j}^P$, $V_{i,j}^Q$, $\theta_{i,j}^P$, $\theta_{i,j}^Q$, $Q_{Gi,j}^P$, and $Q_{Gi,j}^Q$ represent sensitivity coefficients.

In the preferred embodiment of the present disclosure, the sensitivity coefficients are solved, including:

$$V_{i,j}^P = \left.\frac{\partial V_i}{\partial P_j}\right|_0 \Delta P_j, \; \theta_{i,j}^P = \left.\frac{\partial \theta_i}{\partial P_j}\right|_0 \Delta P_j, \; Q_{Gi,j}^P = \left.\frac{\partial Q_{Gi}}{\partial P_j}\right|_0 \Delta P_j, \; j \in S_G \cup S_L$$

$$V_{i,j}^Q = \left.\frac{\partial V_i}{\partial Q_j}\right|_0 \Delta Q_j, \; \theta_{i,j}^Q = \left.\frac{\partial \theta_i}{\partial Q_j}\right|_0 \Delta Q_j, \; Q_{Gi,j}^Q = \left.\frac{\partial Q_{Gi}}{\partial Q_j}\right|_0 \Delta Q_j, \; j \in S_L$$

where $$\left.\frac{\partial V_i}{\partial P_j}\right|_0, \left.\frac{\partial V_i}{\partial Q_j}\right|_0, \left.\frac{\partial \theta_i}{\partial P_j}\right|_0, \left.\frac{\partial \theta_i}{\partial Q_j}\right|_0, \left.\frac{\partial Q_i}{\partial P_j}\right|_0, \left.\frac{\partial Q_{Gi}}{\partial Q_j}\right|_0$$

and $$\left.\frac{\partial Q_{Gi}}{\partial Q_j}\right|_0$$

respectively represent partial derivatives of all variables at a value 0, and can be obtained at a power flow solution at the midpoint of the power injection interval; $\Delta P_j$ and $\Delta Q_j$ respectively represent radii of an active power injection interval and a reactive power injection interval, where $\Delta P_j = (P_{Gj}^U - P_{Gj}^L)/2$, $j \in S_G$, and $P_{Gj}^U$ and $P_{Gj}^L$ respectively represent an upper limit and a lower limit of an active power generation interval of the generator bus; $\Delta P_j = (P_{Lj}^U - P_{Lj}^L)/2$, $j \in S_L$, where $P_{Lj}^U$ and $P_{Lj}^L$ respectively represent an upper limit and a lower limit of an active load demand interval of the load bus; and $\Delta Q_j = (Q_{Lj}^U - Q_{Lj}^L)/2$, $j \in S_L$, where $Q_{Lj}^U$ and $Q_{Lj}^L$ respectively represent an upper limit and a lower limit of a reactive load demand interval of the load bus.

A third model is established based on the first affine expressions, where the third model includes an optimizing-scenarios model of the constraint of the interval power flow equation, including:

$$\min(\max) V_i, \theta_i, Q_{Gi}$$

$$\text{s.t.} \begin{cases} P_{Gi}^L \leq P_{Li} + V_i \sum_{j \in S} V_j (G_{ij}\cos\theta_{ij} + B_{ij}\sin\theta_{ij}) \leq P_{Gi}^U, \; i \in S_G \\ P_{Li}^L \leq -V_i \sum_{j \in S} V_j (G_{ij}\cos\theta_{ij} + B_{ij}\sin\theta_{ij}) \leq P_{Li}^U, \; i \in S_L \\ Q_{Li}^L \leq Q_{Ci} - V_i \sum_{j \in S} V_j (G_{ij}\sin\theta_{ij} - B_{ij}\cos\theta_{ij}) \leq Q_{Li}^U, \; i \in S_L \\ Q_{Gi} - Q_{Li} - V_i \sum_{j \in S} V_j (G_{ij}\sin\theta_{ij} - B_{ij}\cos\theta_{ij}) = 0, \; i \in S_G \\ V_i = V_i^0 + \sum_{j=2}^{n} V_{i,j}^P \varepsilon_{j1}^P + \sum_{j=r+2}^{n} V_{i,j}^Q \varepsilon_{j1}^Q, \; i \in S_L \\ \theta_i = \theta_i^0 + \sum_{j=2}^{n} \theta_{i,j}^P \varepsilon_{j2}^P + \sum_{j=r+2}^{n} \theta_{i,j}^Q \varepsilon_{j2}^Q, \; i \in S_G \cup S_L \\ Q_{Gi} = Q_{Gi}^0 + \sum_{j=2}^{n} Q_{Gi,j}^P \varepsilon_{j3}^P + \sum_{j=r+2}^{n} Q_{Gi,j}^Q \varepsilon_{j3}^Q, \; i \in S_G \\ -1 \leq \varepsilon_{jx}^P, \varepsilon_{jx}^Q \leq 1, x \in (1, 2, 3) \end{cases}$$

The third model is solved by using an interior point method, maximum values $\varepsilon_{j1,max}^P$, $\varepsilon_{j1,max}^Q$, $\varepsilon_{j2,max}^P$, $\varepsilon_{j2,max}^Q$, $\varepsilon_{j3,max}^P$, $\varepsilon_{j3,max}^Q$ and minimum values $\varepsilon_{j1,min}^P$, $\varepsilon_{j1,min}^Q$, $\varepsilon_{j2,min}^P$, $\varepsilon_{j2,min}^Q$, $\varepsilon_{j3,min}^P$, $\varepsilon_{j3,min}^Q$ of the affine noise elements are obtained, and then a high-precision affine expression for the state variable is obtained, in other words, a second affine expression for the state variable $V_i$, a second affine expression for the state variable $\theta_i$, and a second affine expression for the state variable $Q_{Gi}$ are obtained:

$$V_i = V_i^0 + \sum_{j=2}^{n} V_{i,j}^P [\varepsilon_{j1,min}^P, \varepsilon_{j1,max}^P] + \sum_{j=r+2}^{n} V_{i,j}^Q [\varepsilon_{j1,min}^Q, \varepsilon_{j1,max}^Q], \; i \in S_L$$

$$\theta_i = \theta_i^0 + \sum_{j=2}^{n} \theta_{i,j}^P [\varepsilon_{j2,min}^P, \varepsilon_{j2,max}^P] + \sum_{j=r+2}^{n} \theta_{i,j}^Q [\varepsilon_{j2,min}^Q, \varepsilon_{j2,max}^Q], \; i \in S_G \cup S_L$$

$$Q_{Gi} = Q_{Gi}^0 + \sum_{j=2}^{n} Q_{Gi,j}^P [\varepsilon_{j3,min}^P, \varepsilon_{j3,max}^P] + \sum_{j=r+2}^{n} Q_{Gi,j}^Q [\varepsilon_{j3,min}^Q, \varepsilon_{j3,max}^Q], i \in S_G$$

where for an affine expression of an interval, if noise element variables $\varepsilon_{jx}^P$ and $\varepsilon_{jx}^Q$ follow a uniform distribution within the interval, the second affine expression can be considered as a superposition of a series of uniform distributions, each term in each expression is independent, that is, a Lyapunov central limit theorem is satisfied, and values of the $V_i$, the $\theta_i$, and the $Q_{Gi}$ approximately follow a normal distribution; and based on a property of the uniform distribution, a variance of each term in the second affine expression is obtained, including:

$$\sigma_{V,j}^{P(Q)} = \frac{\left(V_{i,j}^{P(Q)} \varepsilon_{j1,max}^{P(Q)} - V_{i,j}^{P(Q)} \varepsilon_{j1,min}^{P(Q)}\right)^2}{12}$$

$$\sigma_{\theta,j}^{P(Q)} = \frac{\left(Q_{i,j}^{P(Q)} \varepsilon_{j2,max}^{P(Q)} - \theta_{i,j}^{P(Q)} \varepsilon_{j2,min}^{P(Q)}\right)^2}{12}$$

$$\sigma_{\theta,j}^{P(Q)} = \left(\theta_{i,j}^{P(Q)} \varepsilon_{j3,max}^{P(Q)} - Q_{Gi,j}^{P(Q)} \varepsilon_{j3,min}^{P(Q)}\right)^2$$

where P(Q) represents choosing either P or Q.

Standard deviations of the state variable $V_i$, the state variable $\theta_i$, and the state variable $Q_{Gi}$ are obtained based on the variance:

$$\sigma_{V,i} = \sqrt{\sum_{j=2}^{n} \sigma_{V,j}^P + \sum_{j=r+2}^{n} \sigma_{V,j}^Q}$$

$$\sigma_{\theta,i} = \sqrt{\sum_{j=2}^{n} \sigma_{\theta,j}^P + \sum_{j=r+2}^{n} \sigma_{\theta,j}^Q}$$

$$\sigma_{Q,i} = \sqrt{\sum_{j=2}^{n} \sigma_{Q,j}^P + \sum_{j=r+2}^{n} \sigma_{Q,j}^Q}$$

Because the values of the $V_i$, the $\theta_i$, and the $Q_{Gi}$ approximately follow the normal distribution, a confidence interval with a confidence coefficient of 0.9973 is obtained for the state variable based on the property of the normal distribution:

$V_i = [V_i^0 - 3\sigma_{V,i}, V_i^0 + 3\sigma_{V,i}]$ $\theta_i = [\theta_i^0 - 3\sigma_{\theta,i}, \theta_i^0 + 3\sigma_{\theta,i}]$ $Q_{Gi} = [Q_{Gi}^0 - 3\sigma_{Q,i}, Q_{Gi}^0 + 3\sigma_{Q,i}]$ That is, the first state variable interval is obtained.

In the preferred embodiment of the present disclosure, the constraint of the interval power flow equation is processed based on a distributed interval theory, and a state variable interval result with a high confidence coefficient is obtained through the central limit theorem. That is, the first state variable interval calculated based on the distributed interval power flow algorithm has the high confidence coefficient, which can reduce conservatism of an interval algorithm and improve accuracy of the method in the present disclosure.

S3. The first model is converted based on the first state variable interval and a security limit definition method, and a second model is obtained, where the second model includes a deterministic optimization model. The S3 specifically includes:

Since each inequality constraint in the first model is a univariate constraint, a variable, an objective function, and a constraint in the first model are represented by using a vector and a function, such that the first model can be represented as a compact model:

$$\min f(X,u) = [f^L, f^U]$$

$$\text{s.t.} \begin{cases} h(X, u) = [h^L, h^U] \\ X_1^{min} \leq X_1 \leq X_1^{max} \\ u^{min} \leq u \leq u^{max} \end{cases}$$

where $f(X,u)$ represents the network loss of the system; $[f^L, f^U]$ represents an interval form of the network loss; $h(X,u)$ represents the constraint of the interval power flow equation; $[h^L, h^U]$ represents a vector of power injection intervals of buses; X represents the first state variable interval; u represents a vector of control variables; $X_1$ represents a vector constituted by a voltage of the load bus and a reactive power generation of a generator, where $X_1^{min}$ and $X_1^{max}$ respectively represent a minimum value and a maximum value of the $X_1$, and $u^{min}$ and $u^{max}$ respectively represent a minimum value and a maximum value of the vector of control variables u; T represents transposition; and if a voltage phase angle of a bus other than the slack bus and an active power generation of the slack bus are represented as vector $X_2$, a vector of state variables of the system can be represented as $X = [X_1^T, X_2^T]^T$.

In the compact model, for any vector of control variables u, interval power flow equation $h(X,u) = [h^L, h^U]$ is solved based on the distributed interval power flow algorithm, and the corresponding x is obtained. The state variable is a distributed interval result with the high confidence coefficient. Due to a boundary of the u, there is vector of control variables $u^i$ that maximizes am interval radius of one $X_i$ of the X, which is denoted as $X_i^{max}$, and each $X_i^{max}$ has one corresponding $u^i$. Therefore, maximum radius $\Delta X_i^{max}$ of the $X_i$ is defined:

$$\Delta X_i^{max} = \max_{u^{min} \leq u \leq u^{max}} \{\Delta X_i | h(X, u) = [h^L, h^U]\}$$

where $\Delta X_i$ represents an interval radius of the state variable $X_i$.

Vector $\Delta X_1^{max}$ constituted by maximum interval radii of all variables in $X_1$ is obtained through Monte Carlo simulation. For a same vector of control variables u, the X represents a solution of the interval power flow equation $h(X,u) = [h^L, h^U]$, X represents a solution of deterministic power flow equation $h(X,u)=\xi$, $\xi \in [h^L, h^U]$, and considering that a deterministic state variable is probably located at any position within a maximum state variable interval in the Monte Carlo simulation, and a maximum radius of a state variable interval corresponding to deterministic state variable $x_1$ is $\Delta X_1^{max}$, there is constraint $X_1^{min} \leq [x_1 - 2\Delta X_1^{max}, x_1 + 2\Delta X_1^{max}] \leq X_1^{max}$ to ensure that the $X_1$ meets a constraint in the compact model. Therefore, an absolute security limit is defined, including:

$$AX_1^{min} = X_1^{min} + 2\Delta X_1^{max}$$

$$AX_1^{max} = X_1^{min} + 2\Delta X_1^{max}$$

Because the absolute security limit represents a security boundary in a worst-case scenario and is strongly conservative, average position ratio $k^I$ is introduced to correct a security limit to reduce conservatism of the security limit:

$$k^I = \frac{x_0 - \underline{X_0}}{\overline{X_0} - \underline{X_0}}$$

where $x_0$ represents a deterministic state variable when the vector of control variables u is in $u_0 = (u^{min} + u^{max})/2$ and scenario $\xi$ is in $\xi_0 = (h^L + h^U)/2$; $\underline{X_0}$ and $\overline{X_0}$ respectively represent a lower boundary and an upper boundary of a state variable interval obtained by solving the interval power flow equation $h(X,u) = [h^L, h^U]$ at the $u_0 = (u^{min} + u^{max})/2$; and assuming that a corresponding average position ratio of the $X_1$ is $k_1^I$, and $0 \leq k_1^I \leq 1$, a corrected security limit can be represented by a following relational expression:

$$MX_1^{min} = X_1^{min} + 2k_1^I \Delta X_1^{max}$$

$$MX_1^{max} = X_1^{max} + 2(1 - k_1^I) \Delta X_1^{max}$$

Because the average position ratio $k^I$ is defined at a midpoint of the control variable, while the control variable generally takes any value within a control variable interval, resulting in deviation of the X from $[\underline{X_0}, \overline{X_0}]$, there is a security error in the corrected security limit, and the state variable may exceed a limit. Therefore, the state variable is precisely corrected by taking an amplitude of the state variable $X_1$ exceeding an upper limit as $\delta_u X_1$ and an amplitude of the state variable $X_1$ exceeding a lower limit as $\delta_l X_1$, including:

$$MX_1^{min} = MX_1^{min} + \delta_l X_1$$

$$MX_1^{max} = MX_1^{max} + \delta_u X_1$$

If a precisely corrected state variable is still in an out-of-limit state, the precisely corrected state variable is precisely corrected until a corrected state variable does not exceed the limit, and a final security limit is obtained. The compact model is converted into the second model based on the final security limit, where the second model can be represented by a following relational expression:

$$\min f(x,u)$$

$$s.t. \begin{cases} h(x, u) = \xi \\ MX_1^{min} \leq x_1 \leq MX_1^{max} \\ u^{min} \leq u \leq u^{max} \end{cases}$$

where $\xi$ represents any scenario in the $[h^L, h^U]$.

S4. A voltage and reactive power control strategy is obtained based on the second model and a primal-dual interior point method. The S4 specifically includes:

A converted deterministic optimization model, namely, the second model, is a nonlinear model, which can be solved by using the primal-dual interior point method. The second model is solved by using the primal-dual interior point method, including:

For the second model, a Lagrange multiplier $\lambda$ and dual variables $v_1$, $v_2$, $\eta_1$, and $\eta_2$ are introduced to construct Lagrange function L that can be represented by a following relational expression:

$$L(x,u,\lambda,v_1,v_2,\eta_1,\eta_2) = f(x,u) + \lambda^T(h(x,u) - \xi) + v_1^T(x_1 - MX_1^{min}) + v_2^T(MX_1^{max} - x_1) + \eta_1^T(u - u^{min}) + \eta_2^T(u^{max} - u)$$

A KKT condition is established for the Lagrange function, where the KKT condition includes a gradient condition, a primal feasibility condition, a dual feasibility condition, and a complementary relaxation condition, and can be represented by a following relational expression:

$$\begin{cases} \nabla_x L(x, u, \lambda, v_1, v_2) = \nabla_x f(x, u) + \lambda^T \nabla_x h(x, u) + v_1^T - v_2^T = 0 \\ \nabla_u L(x, u, \lambda, \eta_1, \eta_2) = \nabla_u f(x, u) + \lambda^T \nabla_u h(x, u) + \eta_1^T - \eta_2^T = 0 \\ \nabla_\lambda L(x, u, \lambda) = h(x, u) - \xi = 0 \\ MX_1^{min} \leq x_1 \leq MX_1^{max} \\ u^{min} \leq u \leq u^{max} \\ v_1, v_2, \eta_1, \eta_2 \geq 0 \\ v_1^T(x_1 - MX_1^{min}) = 0 \\ v_2^T(MX_1^{max} - x_1) = 0 \\ \eta_1^T(u - u^{min}) = 0 \\ \eta_2^T(u^{max} - u) = 0 \end{cases}$$

The KKT condition is solved through Newton gradient descent, including:

Initial point $(x_0, u_0, \lambda_0, v_1^0, v_2^0, \eta_1^0, \eta_2^0)$ is selected to ensure that the inequality constraint is met; and in a $k^{th}$ iteration, a Newton gradient descent equation is obtained based on current $(x_k, u_k, \lambda_k, v_1^k, v_2^k, \eta_1^k, \eta_2^k)$, and can be represented by a following relational expression:

$$H\Delta z = -\nabla L(z_k)$$

where H represents a Hessian matrix of the Lagrange function; $\Delta Z$ represents a Newton step, including $\Delta x$, $\Delta u$, $\Delta \lambda$, $\Delta v_1$, $\Delta v_2$, $\Delta \eta_1$ and $\Delta \eta_2$; $\nabla L(z_k)$ represents a current gradient; and $\alpha$ is set as a step size, and a Newton step variable updating scheme is obtained and can be represented by a following relational expression:

$$z_{k+1} = z_k + \alpha \Delta z$$

where $z_k$ represents a vector constituted by a variable in the $k^{th}$ iteration, including $x_k$, $u_k$, $\lambda_k$, $v_1^k$, $v_2^k$, $\eta_1^k$, $\eta_2^k$; and $z_{k+1}$ represents a variable vector in a $(k+1)^{th}$ iteration, including $x_{k+1}$, $u_{k+1}$, $\lambda_{k+1}$, $v_1^{k+1}$, $v_2^{k+1}$, $\eta_1^{k+1}$, $\eta_2^{k+1}$.

Whether a convergence condition is met is determined, and if the convergence condition is met, it is determined that the Newton gradient descent converges, an iteration is stopped, and solving result $(x^*, u^*, \lambda^*, v_1^*, v_2^*, \eta_1^*, \eta_2^*)$ of the second model is output, that is, the voltage and reactive power control strategy is obtained. The convergence condition includes that duality gap Duality Gap = $v_1(x_1 - MX_1^{min}) + v_2(MX_1^{max} - x_1) + \eta_1(u - u^{min}) + \eta_2(u^{max} - u)$ is less than a convergence tolerance, and the primal feasibility condition, the dual feasibility condition, and the complementary relaxation condition are all met. The convergence tolerance is generally a very small value close to 0.

In the preferred embodiment of the present disclosure, the overall interval reactive power optimization model is converted into a deterministic model through security limit definition. The KKT condition is established for solving. In this way, a convergence problem of a nonlinear interval optimization algorithm is resolved, and a safer and more economical interval voltage control strategy is achieved.

In the preferred embodiment of the present disclosure, after the voltage and reactive power control strategy is obtained through the solving, the reactive power optimization method further includes:

A distributed interval power flow is calculated based on the voltage and reactive power control strategy, and vector of control variables u* and corresponding second state variable interval X* are obtained, including:

The vector of control variables u* in the voltage and reactive power control strategy, namely, the solving result (x*, u*, λ*, ν$_1$*, ν$_2$*, η$_1$*, η$_2$*), includes final transformer transformation ratio T$_l$*, generator terminal voltage V$_i$* (i∈ S$_G$), and the reactive power compensation capacity Q$_{Ci}$*, namely, an optimal reactive power control strategy corresponding to the first model. A distributed interval power flow model under the vector of control variables u* is obtained based on the vector of control variables u*, and can be represented by a following relational expression:

$$\min(\max) V_i, \theta_i, Q_{Gi}$$

$$s.t. \begin{cases} P_{Gi}^L \leq P_{Li} + V_i^* \sum_{j \in S} V_j (G_{ij}^* \cos\theta_{ij} + B_{ij}^* \sin\theta_{ij}) \leq P_{Gi}^U, i \in S_G \\ P_{Li}^L \leq -V_i^* \sum_{j \in S} V_j (G_{ij}^* \cos\theta_{ij} + B_{ij}^* \sin\theta_{ij}) \leq P_{Li}^U, i \in S_L \\ Q_{Li}^L \leq Q_{Ci}^* - V_i^* \sum_{j \in S} V_j (G_{ij}^* \sin\theta_{ij} - B_{ij}^* \cos\theta_{ij}) \leq Q_{Li}^U, i \in S_L \\ Q_{Gi} - Q_{Li}^* - V_i^* \sum_{j \in S} V_j (G_{ij}^* \sin\theta_{ij} - B_{ij}^* \cos\theta_{ij}) = 0, i \in S_G \\ V_i = V_i^0 + \sum_{j=2}^{n} V_{i,j}^P \varepsilon_{j1}^P + \sum_{j=r+2}^{n} V_{i,j}^Q \varepsilon_{j1}^Q, i \in S_L \\ \theta_i = \theta_i^0 + \sum_{j=2}^{n} \theta_{i,j}^P \varepsilon_{j2}^P + \sum_{j=r+2}^{n} \theta_{i,j}^Q \varepsilon_{j2}^Q, i \in S_G \cup S_L \\ Q_{Gi} = Q_{Gi}^0 + \sum_{j=2}^{n} Q_{Gi,j}^P \varepsilon_{j3}^P + \sum_{j=r+2}^{n} Q_{Gi,j}^Q \varepsilon_{j3}^Q, i \in S_G \\ -1 \leq \varepsilon_{jx}^P, \varepsilon_{jx}^Q \leq 1, x \in (1, 2, 3) \end{cases}$$

where G$_{ij}$* and B$_{ij}$* respectively represent a real part and an imaginary part of a bus admittance matrix under the final transformer transformation ratio T$_l$*.

The corresponding second state variable interval X* of the system under the u* is obtained through solving based on the distributed interval power flow model under the u* and the distributed interval power flow algorithm, where the X* includes voltage interval V$_i$* of the load bus, phase angle interval θ$_i$* of the bus voltage, and reactive power generation interval Q$_{Gi}$* of the generator. The u* and the X* are output, in other words, the vector of control variables and the corresponding second state variable interval are obtained.

In the preferred embodiment of the present disclosure, the second state variable interval is calculated based on the voltage and reactive power control strategy, such that the method in the present disclosure can intuitively demonstrate lower conservatism of the state variable interval, thereby further verifying a capability of the present disclosure in improving solving accuracy of the model.

In the preferred embodiment of the present disclosure, a computer medium is further provided, including a processor, a memory, and a computer program for implementing the method in the present disclosure.

In order to evaluate effectiveness and superiority of the reactive power optimization method for a power system based on distributed interval optimization in the present disclosure, following three examples are used for verification.

Figure 2:
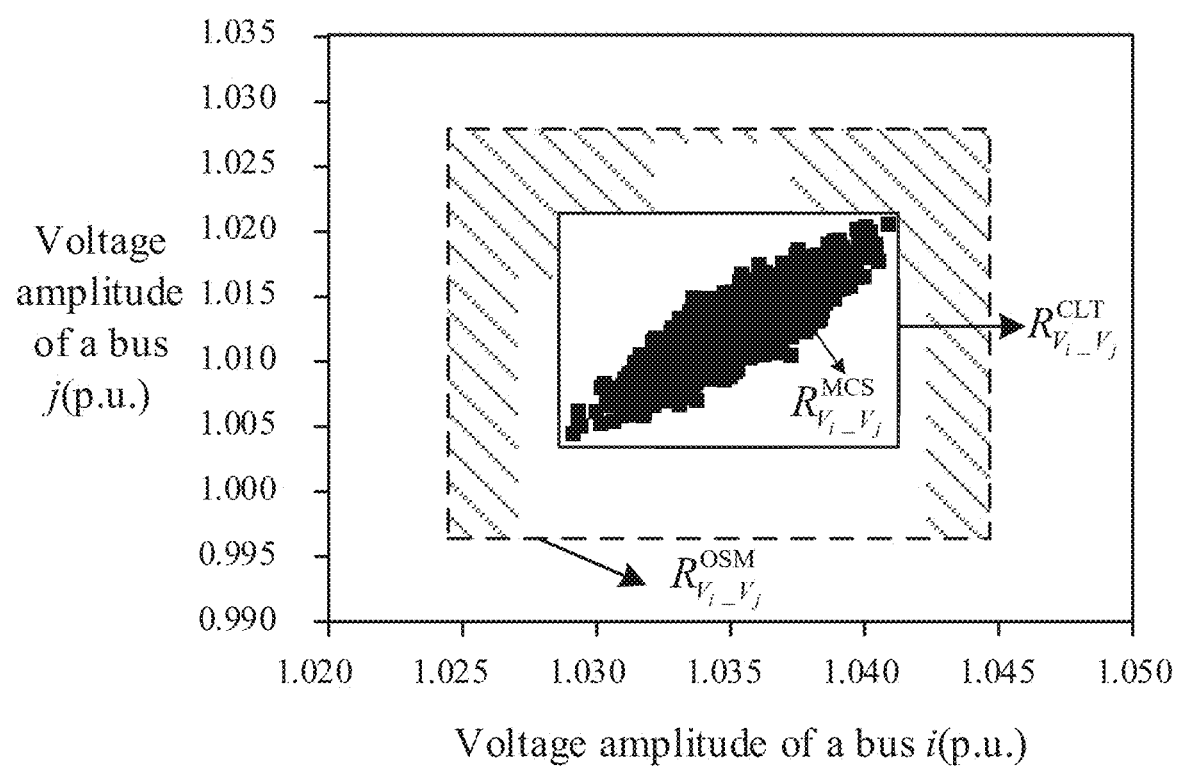
FIG. 2 is a schematic diagram of reducing conservatism through distributed interval optimization according to a preferred embodiment of the present disclosure.

(1) The distributed interval power flow algorithm is compared with an interval power flow algorithm based on an optimizing-scenarios method, and an IEEE30 bus testing system is used to verify a capability of distributed interval optimization in reducing the conservatism. In an example, an IEEE 30 bus used includes six generators, 37 transmission lines, four transformers, and two reactive power compensation capacitors. Per-unit values are used for all parameters, and reference power is 100 MVA. Each generator (excluding a slack generator) in the system is a renewable energy generator with a fluctuating power output. Table 1 shows an active power generation interval of the generator and ranges of related variables. All the transformers have a transformation ratio ranging from 0.9 p.u. to 1.1p.u., with a step size of 0.05. A parameter setting of the reactive power compensation capacitor is shown in Table 2. A voltage range of a load bus is 0.95 p.u. to 1.05p.u., assuming that a load fluctuates within ±20% of an initial load. In this example, as shown in FIG. 2, a range of a power flow state variable interval obtained by the distributed interval optimization algorithm is narrower than that obtained by the optimizing-scenarios method, and is closer to a range of an actual state variable interval obtained through the Monte Carlo simulation. A result obtained by the distributed interval power flow algorithm is better. In FIG. 2 R$_{V_i-V_j}^{MCS}$ represents a range constituted by all possible values of voltage V$_i^{MCS}$ of the bus i and voltage V$_j^{MCS}$ of the bus j that are obtained through the Monte Carlo simulation, R$_{V_i-V_j}^{CLT}$ represents a range constituted by voltage interval V$_i^{CLT}$ of the bus i and that voltage interval V$_j^{CLT}$ of the bus j that are obtained through distributed interval power flow calculation, and R$_{V_i-V_j}^{OSM}$ represents a range constituted by voltage interval V$_i^{OSM}$ of the bus i and voltage interval V$_j^{OSM}$ of the bus j that are obtained through power flow calculation based on the optimizing-scenarios method.

TABLE 1

Power generation interval of a generator bus of the IEEE30 bus and related parameters (p.u.)

| Bus number | Active power generation interval | Reactive power generation | | Voltage | |
|---|---|---|---|---|---|
| | | Lower limit | Upper limit | Lower limit | Upper limit |
| 1 | / | −0.2 | 1.5 | 0.9 | 1.1 |
| 2 | [0.64, 0.96] | −0.2 | 0.6 | 0.9 | 1.1 |
| 5 | [0.40, 0.60] | −0.15 | 0.63 | 0.9 | 1.1 |
| 8 | [0.16, 0.24] | −0.15 | 0.5 | 0.9 | 1.1 |
| 11 | [0.16, 0.24] | −0.1 | 0.4 | 0.9 | 1.1 |
| 13 | [0.16, 0.24] | −0.15 | 0.45 | 0.9 | 1.1 |

TABLE 2

Parameters of the reactive power compensation capacitor of the IEEE30 bus

| Bus number | Lower limit | Upper limit | Switch step size |
|---|---|---|---|
| 10 | 0 | 0.5 | 0.1 |
| 24 | 0 | 0.1 | 0.02 |

(2) The reactive power optimization method for a power system based on distributed interval optimization in the present disclosure is compared with an interval reactive power optimization algorithm based on an intelligent algorithm (particle swarm algorithm). In the intelligent algorithm, the optimizing-scenarios method is used to process the constraint of the interval power flow equation, and superiority of the reactive power optimization method for a power system based on distributed interval optimization in both convergence and optimization is verified. An example used is the same as the example of the IEEE 30 bus in (1). In addition, a parameter setting of an interior point method in the example is as follows: convergence accuracy $\varepsilon=10^{-6}$, and central parameter $\delta=0.1$. When a maximum radius of a state variable interval is solved, a quantity of Monte Carlo sampling times is set to 100 to ensure solving efficiency. Through verification and comparison, the reactive power optimization method for a power system based on a distributed interval optimization has a higher calculation speed, avoids local convergence, and achieves a more economical voltage control strategy. The reactive power optimization method for a power system based on distributed interval optimization has a better optimization effect.

Figure 3:
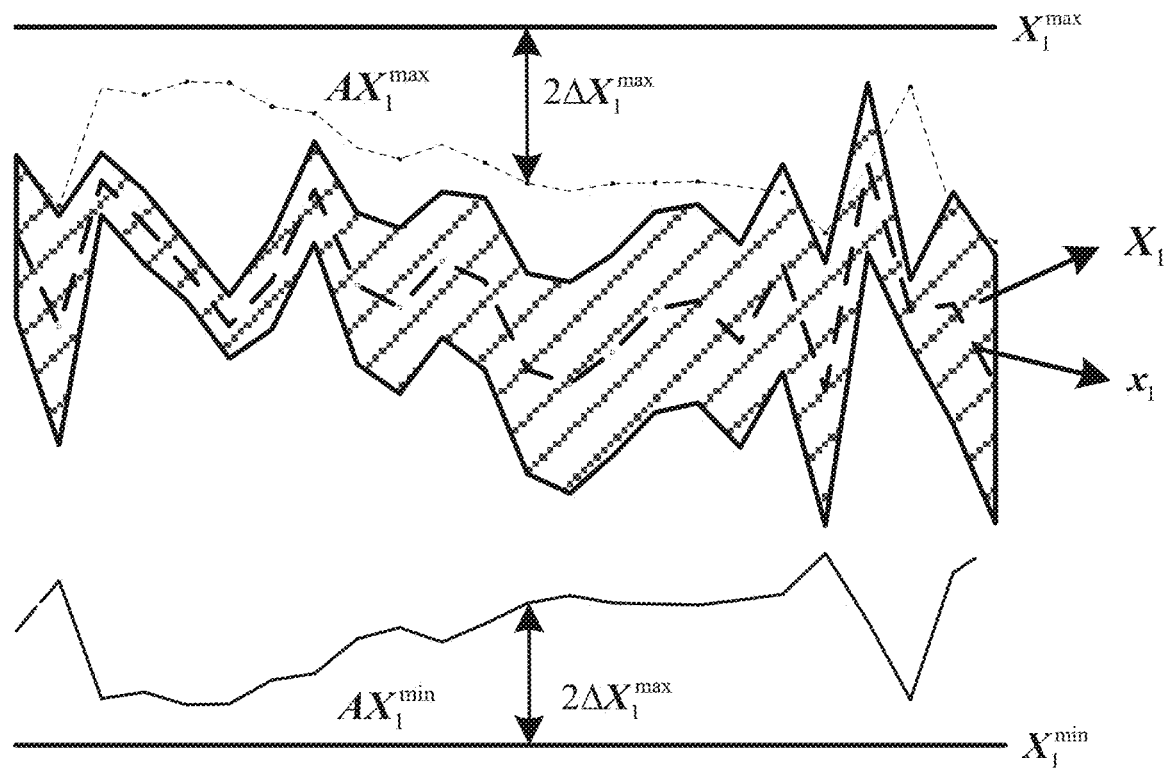
FIG. 3 is a schematic diagram of defining a security limit according to a preferred embodiment of the present disclosure.

(3) The reactive power optimization method for a power system based on distributed interval optimization in the present disclosure is compared with an interval reactive power optimization method based on security limit definition. The reactive power optimization method for a power system based on distributed interval optimization in the present disclosure includes distributed interval power flow analysis and the security limit definition, while the interval reactive power optimization method based on the security limit definition uses the optimizing-scenarios method to process the constraint of the interval power flow equation. The security limit definition is shown in FIG. 3. Superiority and economical efficiency of the method in the present disclosure is verified by using an IEEE118 bus system, and application capabilities of the method in the present disclosure under a large bus system and different power output fluctuations are verified. In an example, an IEEE118 bus used includes 54 generators, 64 load buses, 169 transmission lines, nine transformers, and nine reactive power compensation capacitors. Per-unit values are used for all parameters, and reference power is 100 MVA. Each generator (excluding the slack generator) in the system is a renewable energy generator with a fluctuating power output. All the transformers have a transformation ratio ranging from 0.9 p.u. to 1.1 p.u., with an adjustment step size of 0.05. A parameter setting of the reactive power compensation capacitor is shown in Table 3. A voltage range of a generator bus is 0.9 p.u. to 1.1 p.u and a voltage range of a load bus is 0.95 p.u. to 1.05 p.u., assuming an active power generation of the generator fluctuates within ±10% of an initial power output and a load fluctuates within ±20% of an initial load. A parameter setting of the interior point method is the same as that of the interior point method in (2). Through verification and comparison, the reactive power optimization method for a power system based on distributed interval optimization can achieve a more economical voltage control strategy, reduce conservatism of the interval reactive power optimization method based on the security limit definition, and achieves a smaller network loss of the system. The reactive power optimization method for a power system based on distributed interval optimization achieves better economical efficiency.

TABLE 3

Parameters of the reactive power compensation capacitor of the IEEE118 bus (p.u.)

| Bus number | Lower limit | Upper limit | Switch step size |
|---|---|---|---|
| 5 | −0.5 | 0 | 0.1 |
| 17 | 0 | 0.1 | 0.02 |
| 37 | 0 | 0.2 | 0.04 |
| 44 | −0.3 | 0 | 0.06 |
| 45 | 0 | 0.2 | 0.04 |
| 48 | 0 | 0.2 | 0.04 |
| 79 | 0 | 0.3 | 0.06 |
| 82 | 0 | 0.3 | 0.06 |
| 83 | 0 | 0.2 | 0.04 |

From the above, it can be concluded that according to the reactive power optimization method for a power system based on distributed interval optimization in the present disclosure, a state variable interval obtained by processing a constraint of an interval power flow equation based on a distributed interval power flow algorithm has a high confidence coefficient. Therefore, the method can reduce conservatism of an interval algorithm and is closer to an actual range, thereby improving solving accuracy, reducing a network loss of the system, and improving economical efficiency and practicality of a voltage control strategy. An interval reactive power optimization model is converted into a deterministic optimization model by using a security limit definition method, and the deterministic optimization model is solved by using a primal-dual interior point method, such that the method in the present disclosure resolves a convergence problem of a nonlinear interval optimization algorithm and can achieve a safer and more economical interval voltage control strategy.

What are described above are merely preferred embodiments of the present disclosure and are not intended to limit the present disclosure, and various changes and modifications may be made to the present disclosure by those skilled in the art. Any modifications, equivalent substitutions, improvements, etc. made within the spirit and scope of the present disclosure should be included within the protection scope of the present disclosure.

What is claimed is:

1. A reactive power optimization method for a power system based on distributed interval optimization, comprising following steps:

S1, constructing a first model, wherein the first model comprises an interval reactive power optimization model of a power system with a high renewable energy penetration rate, and the interval reactive power optimization model comprises an objective function, a first constraint, and a constraint of an interval power flow equation, wherein the objective function comprises a network loss of the power system:

$$\min P_{loss} = \sum_{i \in S}\sum_{j \in S} V_i V_j G_{ij} \cos\theta_{ij}$$

wherein S represents a set of all buses in the power system; i and j respectively represent a bus i and a bus j; $V_i$ and $V_j$ respectively represent voltage amplitudes of the bus i and the bus j, $G_{ij}$ represents a real part of a system bus admittance matrix; and $\theta_{ij}=\theta_i-\theta_j$, wherein $\theta_i$ and $\theta_j$ respectively represent voltage phase angles of the bus i and the bus j;

S2, obtaining a first state variable interval based on the constraint of the interval power flow equation and a distributed interval power flow algorithm, wherein the S2 comprises:

processing the constraint of the interval power flow equation based on the distributed interval power flow algorithm;

assuming that a total quantity of buses in the power system is n, and a total quantity of generator buses excluding a slack bus is r, representing a state variable $V_i$, a state variable $\theta_i$, and a state variable $Q_{Gi}$ in the constraint of the interval power flow equation as affine forms, wherein a first affine expression for the state variable $V_i$, a first affine expression for the state variable $\theta_i$, and a first affine expression for the state variable $Q_{Gi}$ comprise:

$$V_i = V_i^0 + \sum_{j=2}^{n} V_{i,j}^P \varepsilon_{j1}^P + \sum_{j=r+2}^{n} V_{i,j}^Q \varepsilon_{j1}^Q, i \in S_L$$

$$\theta_i = \theta_i^0 + \sum_{j=2}^{n} \theta_{i,j}^P \varepsilon_{j2}^P + \sum_{j=r+2}^{n} \theta_{i,j}^Q \varepsilon_{j2}^Q, i \in S_G \cup S_L$$

$$Q_{Gi} = Q_{Gi}^0 + \sum_{j=2}^{n} Q_{Gi,j}^P \varepsilon_{j3}^P + \sum_{j=r+2}^{n} Q_{Gi,j}^Q \varepsilon_{j3}^Q, i \in S_G$$

wherein $V_i^0$, $\theta_i^0$, and $Q_{Gi}^0$ respectively represent interval midpoints of the $V_i$, the $\theta_i$, and the $Q_{Gi}$, and are obtained by solving a power flow equation at a midpoint of a power injection interval of the power system; $\varepsilon_{j1}^P$, $\varepsilon_{j1}^Q$, $\varepsilon_{j2}^P$, $\varepsilon_{j2}^Q$, $\varepsilon_{j3}^P$, and $\varepsilon_{j3}^Q$ represent affine noise elements whose value ranges are all $[-1,1]$; $V_{i,j}^P$, $V_{i,j}^Q$, $\theta_{i,j}^P$, $\theta_{i,j}^Q$, $Q_{Gi,j}^P$, and $Q_{Gi,j}^Q$ represent sensitivity coefficients; $S_L$ represents a load bus; and $S_G$ represents a generator bus excluding the slack bus; establishing a third model based on the first affine expressions, wherein the third model comprises an optimizing-scenarios model of the constraint of the interval power flow equation, comprising:

$$\min(\max) V_i, \theta_i, Q_{Gi}$$

$$\text{s.t.}\begin{cases} P_{Gi}^L \leq P_{Li} + V_i^* \sum_{j \in S} V_j(G_{ij}^*\cos\theta_{ij} + B_{ij}^*\sin\theta_{ij}) \leq P_{Gi}^U, i \in S_G \\ P_{Li}^L \leq -V_i \sum_{j \in S} V_j(G_{ij}\cos\theta_{ij} + B_{ij}\sin\theta_{ij}) \leq P_{Li}^U, i \in S_L \\ Q_{Li}^L \leq Q_{Ci} - V_i \sum_{j \in S} V_j(G_{ij}\sin\theta_{ij} - B_{ij}\cos\theta_{ij}) \leq Q_{Li}^U, i \in S_L \\ Q_{Gi} - Q_{Li} - V_i \sum_{j \in S} V_j(G_{ij}\sin\theta_{ij} - B_{ij}\cos\theta_{ij}) = 0, i \in S_G \\ V_i = V_i^0 + \sum_{j=2}^{n} V_{i,j}^P \varepsilon_{j1}^P + \sum_{j=r+2}^{n} V_{i,j}^Q \varepsilon_{j1}^Q, i \in S_L \\ \theta_i = \theta_i^0 + \sum_{j=2}^{n} \theta_{i,j}^P \varepsilon_{j2}^P + \sum_{j=r+2}^{n} \theta_{i,j}^Q \varepsilon_{j2}^Q, i \in S_G \cup S_L \\ Q_{Gi} = Q_{Gi}^0 + \sum_{j=2}^{n} Q_{Gi,j}^P \varepsilon_{j3}^P + \sum_{j=r+2}^{n} Q_{Gi,j}^Q \varepsilon_{j3}^Q, i \in S_G \\ -1 \leq \varepsilon_{jx}^P, \varepsilon_{jx}^Q \leq 1, x \in (1, 2, 3) \end{cases}$$

wherein $P_{Gi}^L$ and $P_{Gi}^U$ respectively represent a lower boundary and an upper boundary of an active power generation interval of a renewable energy unit; when $i \in S_G$, $P_{Li}$ represents an active load of the generator bus excluding the slack bus; $P_{Li}^L$ and $P_{Li}^U$ respectively represent a lower boundary and an upper boundary of an active load interval of the load bus; $Q_{Li}^L$ and $Q_{Li}^U$ respectively represent a lower boundary and an upper boundary of a reactive load interval of the load bus; $Q_{Ci}$ represents a reactive power compensation capacity of the bus i; and when $i \in S_G$, $Q_{Gi}$ and $Q_{Li}$ respectively represent a reactive power generation and a reactive load of the generator bus excluding the slack bus;

solving the third model by using an interior point method, obtaining maximum values $\varepsilon_{j1,max}^P$, $\varepsilon_{j1,max}^Q$, $\varepsilon_{j2,max}^P$, $\varepsilon_{j2,max}^Q$, $\varepsilon_{j3,max}^P$, and $\varepsilon_{j3,max}^Q$ and minimum values $\varepsilon_{j1,min}^P$, $\varepsilon_{j1,min}^Q$, $\varepsilon_{j2,min}^P$, $\varepsilon_{j2,min}^Q$, $\varepsilon_{j3,min}^P$, and $\varepsilon_{j3,min}^Q$ of the affine noise elements, and then obtaining a high-precision affine expression for the state variable, in other words, obtaining a second affine expression for the state variable $V_i$, a second affine expression for the state variable $\theta_i$, and a second affine expression for the state variable $Q_{Gi}$:

Gi $$V_i = V_i^0 + \sum_{j=2}^{n} V_{i,j}^P [\varepsilon_{j1,min}^P, \varepsilon_{j1,max}^P] + \sum_{j=r+2}^{n} V_{i,j}^Q [\varepsilon_{j1,min}^Q, \varepsilon_{j1,max}^Q], i \in S_L$$

$$\theta_i = \theta_i^0 + \sum_{j=2}^{n} \theta_{i,j}^P [\varepsilon_{j2,min}^P, \varepsilon_{j2,max}^P] + \sum_{j=r+2}^{n} \theta_{i,j}^Q [\varepsilon_{j2,min}^Q, \varepsilon_{j2,max}^Q], i \in S_G \cup S_L$$

$$Q_{Gi} = Q_{Gi}^0 + \sum_{j=2}^{n} Q_{Gi,j}^P [\varepsilon_{j3,min}^P \varepsilon_{j3,max}^P] + \sum_{j=r+2}^{n} Q_{Gi,j}^Q [\varepsilon_{j3,min}^Q \varepsilon_{j3,max}^Q], i \in S_G$$

wherein for an affine expression of an interval, when noise element variables $\varepsilon_{jx}^P$ and $\varepsilon_{jx}^Q$ follow a uniform distribution within the interval, the second affine expression is considered as a superposition of a series of uniform distributions, each term in each expression is independent, that is, a central limit theorem is satisfied, and values of the $V_i$, the $\theta_i$, and the $Q_{Gi}$ approximately follow a normal distribution; and based on a property of the uniform distribution, a variance of each term in the second affine expression is obtained, comprising:

$$\sigma_{V,j}^{P(Q)} = \frac{(V_{i,j}^{P(Q)} \varepsilon_{j1,max}^{P(Q)} - V_{i,j}^{P(Q)} \varepsilon_{j1,min}^{P(Q)})^2}{12}$$

$$\sigma_{\theta,j}^{P(Q)} = \frac{(\theta_{i,j}^{P(Q)} \varepsilon_{j2,max}^{P(Q)} - \theta_{i,j}^{P(Q)} \varepsilon_{j2,min}^{P(Q)})^2}{12}$$

$$\sigma_{Q,j}^{P(Q)} = \frac{(Q_{Gi,j}^{P(Q)} \varepsilon_{j3,max}^{P(Q)} - Q_{Gi,j}^{P(Q)} \varepsilon_{j3,min}^{P(Q)})^2}{12}$$

wherein P(Q) represents choosing either P or Q;
obtaining standard deviations of the state variable $V_i$, the state variable $\theta_i$, and the state variable $Q_{Gi}$ based on the variance:

$$\sigma_{V,i} = \sqrt{\sum_{j=2}^{n} \sigma_{V,j}^P = \sum_{j=r+2}^{n} \sigma_{V,j}^Q}$$

$$\sigma_{\theta,i} = \sqrt{\sum_{j=2}^{n} \sigma_{\theta,j}^P + \sum_{j=r+2}^{n} \sigma_{\theta,j}^Q}$$

$$\sigma_{Q,i} = \sqrt{\sum_{j=2}^{n} \sigma_{Q,j}^P + \sum_{j=r+2}^{n} \sigma_{Q,j}^Q},$$

and
because the values of the $V_i$, the $\theta_i$, and the $Q_{Gi}$ approximately follow the normal distribution, obtaining a confidence interval with a confidence coefficient of 0.9973 for the state variable based on the property of the normal distribution:

$$V_i = [V_i^0 - 3\sigma_{V,i}, V_i^0 + 3\sigma_{V,i}]$$

$$\theta_i = [\theta_i^0 - 3\sigma_{\theta,i}, \theta_i^0 + 3\sigma_{\theta,i}]$$

$$Q_{Gi} = [Q_{Gi}^0 - 3\sigma_{Q,i}, Q_{Gi}^0 + 3\sigma_{Q,i}]$$

that is, obtaining the first state variable interval;
S3, converting the first model based on the first state variable interval and a security limit definition method, and obtaining a second model, wherein the second model comprises a deterministic optimization model;
S4, obtaining a voltage and reactive power control strategy based on the second model and a primal-dual interior point method; and
S5, controlling the power system according to the obtained voltage and reactive power control strategy.

2. The reactive power optimization method for the power system based on the distributed interval optimization according to claim 1, wherein the constraint of the interval power flow equation comprises:

$$s.t. \begin{cases} \hat{P}_{Gi} - P_{Li} - V_i \sum_{j \in S} V_j(G_{ij}\cos\theta_{ij} + B_{ij}\sin\theta_{ij}) = 0, i \in S_G \\ P_{Gi} - P_{Li} - V_i \sum_{j \in S} V_j(G_{ij}\cos\theta_{ij} + B_{ij}\sin\theta_{ij}) = 0, i \in S_{Gs} \\ Q_{Gi} - Q_{Li} - V_i \sum_{j \in S} V_j(G_{ij}\sin\theta_{ij} - B_{ij}\cos\theta_{ij}) = 0, i \in S_G \cup S_{Gs} \\ -\hat{P}_{Li} - V_i \sum_{j \in S} V_j(G_{ij}\cos\theta_{ij} + B_{ij}\sin\theta_{ij}) = 0, i \in S_L \\ Q_{Gi} - \hat{Q}_{Li} - V_i \sum_{j \in S} V_j(G_{ij}\sin\theta_{ij} - B_{ij}\cos\theta_{ij}) = 0, i \in S_L \\ \theta_{ij} = \theta_i - \theta_j \end{cases}$$

wherein $B_{ij}$ represents an imaginary part of the power system bus admittance matrix; $\hat{P}_{Gi}$ represents the active power generation interval $\hat{P}_{Gi} = [P_{Gi}^L, P_{Gi}^U]$ of the renewable energy unit; $P_{Gi}^L$ and $P_{Gi}^U$ respectively represent the lower boundary and the upper boundary of the active power generation interval of the renewable energy unit; $S_G$ represents the generator bus excluding the slack bus; $S_{Gs}$ represents the slack bus, wherein the power system comprises one slack bus; when $i \in S_G$, $P_{Li}$ represents the active load of the generator bus excluding the slack bus; when $i \in S_{Gs}$, $P_{Li}$ represents an active load of the slack bus; $P_{Gi}$ represents an active power generation of a slack bus; when $i \in S_G$, $Q_{Gi}$ and $Q_{Li}$ respectively represent the reactive power generation and the reactive load of the generator bus excluding the slack bus; when $i \in S_{Gs}$, $Q_{Gi}$ and $Q_{Li}$ respectively represent a reactive power generation and a reactive load of the slack bus; the active load and the reactive load of the slack bus, as well as the active load and the reactive load of the generator bus are deterministic data; $\hat{P}_{Li}$ and $\hat{Q}_{Li}$ respectively represent an active load interval $\hat{P}_{Li} = [P_{Li}^L, P_{Li}^U]$ and a reactive load interval $\hat{Q} = [Q_{Li}^L, Q_{Li}^U]$ of a load bus i; $P_{Li}^L$ and $P_{Li}^U$ respectively represent the lower boundary and the upper boundary of the active load interval of the load bus; $Q_{Li}^L$ and $Q_{Li}^U$ respectively represent the lower boundary and the upper boundary of the reactive load interval of the load bus; $S_L$ represents the load bus; and $Q_{Ci}$ represents the reactive power compensation capacity of the bus i.

3. The reactive power optimization method for the power system based on the distributed interval optimization according to claim 2, wherein the first constraint comprises:

$$s.t. \begin{cases} V_i^{min} \leq V_i \leq V_i^{max}, i \in S_G \cup S_L \\ P_i^{min} \leq P_{Gi} \leq P_{Gi}^{max}, i \in S_{Gs} \\ Q_{Gi}^{min} \leq Q_{Gi} \leq Q_{Gi}^{max}, i \in S_G \cup S_{Gs} \\ T_l^{min} \leq T_l \leq T_l^{max}, i \in S_T \\ Q_{Ci}^{min} \leq Q_{Ci} \leq Q_{Ci}^{max}, i \in S_C \end{cases}$$

wherein $V_1^{min}$ and $V_i^{max}$ respectively represent a lower limit and an upper limit of an amplitude of a bus voltage; $P_{Gi}^{min}$ and $P_{Gi}^{max}$ respectively represent a lower limit and an upper limit of the active power generation of the slack bus; when $i \in S_G$, $Q_{Gi}^{min}$ and $Q_{Gi}^{max}$ respectively represent a lower limit and an upper limit of the reactive power generation of the generator bus excluding the slack bus; when $i \in S_{Gs}$, $Q_{Gi}^{min}$ and $Q_{Gi}^{max}$ respectively represent a lower limit and an upper limit of the reactive power generation of the slack bus; $T_l$ represents a transformer transformation ratio; $T_l^{min}$ and $T_l^{max}$ respectively represent a lower limit and an upper limit of the transformer transformation ratio; $S_T$ represents a transformer branch; $Q_{Ci}^{min}$ and $Q_{Ci}^{max}$ respectively represent a lower limit and an upper limit of the reactive power compensation capacity; and $S_C$ represents a reactive power compensation bus.

4. The reactive power optimization method for the power system based on the distributed interval optimization according to claim 3, further comprising:

solving the sensitivity coefficients, comprising:

$$V_{i,j}^P = \left.\frac{\partial V_i}{\partial P_j}\right|_0 \Delta P_j, \; \theta_{i,j}^P = \left.\frac{\partial \theta_i}{\partial P_j}\right|_0 \Delta P_j, \; Q_{Gi,j}^P = \left.\frac{\partial Q_{Gi}}{\partial P_j}\right|_0 \Delta P_j, \; j \in S_G \cup S_L$$

$$V_{i,j}^Q = \left.\frac{\partial V_i}{\partial Q_j}\right|_0 \Delta Q_j, \; \theta_{i,j}^Q = \left.\frac{\partial \theta_i}{\partial Q_j}\right|_0 \Delta Q_j, \; Q_{Gi,j}^Q = \left.\frac{\partial Q_{Gi}}{\partial Q_j}\right|_0 \Delta Q_j, \; j \in S_L$$

wherein $$\left.\frac{\partial V_i}{\partial P_j}\right|_0, \left.\frac{\partial V_i}{\partial Q_j}\right|_0, \left.\frac{\partial \theta_i}{\partial P_j}\right|_0, \left.\frac{\partial \theta_i}{\partial Q_j}\right|_0, \left.\frac{\partial Q_{Gi}}{\partial P_j}\right|_0, \text{ and } \left.\frac{\partial Q_{Gi}}{\partial Q_j}\right|_0$$

respectively represent partial derivatives of all variables at a value 0, and are obtained at a power flow solution at the midpoint of the power injection interval; $\Delta P_j$ and $\Delta Q_j$ respectively represent radii of an active power injection interval and a reactive power injection interval, wherein $\Delta P_j = (P_{Gj}^U - P_{Gj}^L)/2$, $j \in S_G$, and $P_{Gj}^U$ and $P_{Gj}^L$ respectively represent an upper limit and a lower limit of an active power generation interval of the generator bus; $\Delta P_j = (P_{Lj}^U - P_{Lj}^L)/2$, $j \in S_L$, wherein $P_{Lj}^U$ and $P_{Lj}^L$ respectively represent an upper limit and a lower limit of an active load demand interval of the load bus; and $\Delta Q_j = (Q_{Lj}^U - Q_{Lj}^L)/2$, $j \in S_L$, wherein $Q_{Lj}^U$ and $Q_{Lj}^L$ respectively represent an upper limit and a lower limit of a reactive load demand interval of the load bus.

5. The reactive power optimization method for the power system based on the distributed interval optimization according to claim 4, wherein the S3 comprises:

since each inequality constraint in the first model is a univariate constraint, representing a variable, an objective function, and a constraint in the first model by using a vector and a function, and representing the first model as a compact model:

$$\min f(X,u) = [f^L, f^U]$$

$$\text{s.t.} \begin{cases} h(X, u) = [h^L, h^U] \\ X_1^{min} \leq X_1 \leq X_1^{max} \\ u^{min} \leq u \leq u^{max} \end{cases}$$

wherein $f(X,u)$ represents the network loss of the power system; $[f^L, f^U]$ represents an interval form of the network loss; $h(X,u)$ represents the constraint of the interval power flow equation; $[h^L, h^U]$ represents a vector of power injection intervals of buses; X represents the first state variable interval; u represents a vector of control variables; $X_1$ represents a vector constituted by a voltage of the load bus and a reactive power generation of a generator, wherein $X_1^{min}$ and $X_1^{max}$ respectively represent a minimum value and a maximum value of the $X_1$, and $u^{min}$ and $u^{max}$ respectively represent a minimum value and a maximum value of the vector of control variables u; T represents transposition; and when a voltage phase angle of a bus other than the slack bus and an active power generation of the slack bus are represented as a vector $X_2$, a vector of state variables of the power system is represented as $X = [X_1^T, X_2^T]^T$;

in the compact model, for any vector of control variables u, solving the interval power flow equation $h(X,u) = [h^L, h^U]$ based on the distributed interval power flow algorithm, and obtaining the corresponding X, wherein due to a boundary of the u, there is a vector of control variables $u^i$ that maximizes an interval radius of one $X_i$ of the x, which is denoted as $X_i^{max}$, and each $X_i^{max}$ has one corresponding $u^i$; and therefore, defining a maximum radius $\Delta X_i^{max}$ of the $X_i$:

$$\Delta X_i^{max} = \max_{u^{min} \leq u \leq u^{max}} \{\Delta X_i | h(X, u) = [h^L, h^U]\}$$

wherein $\Delta X_i$ represents an interval radius of the state variable $X_i$;

obtaining a vector $\Delta X_1^{max}$ constituted by maximum interval radii of all variables in $X_1$ through Monte Carlo simulation, wherein for a same vector of control variables u, the X represents a solution of the interval power flow equation $h(X,u) = [h^L, h^U]$, x represents a solution of a deterministic power flow equation $h(X, u) = \xi$, $\xi \in [h^L, h^U]$, and considering that a deterministic state variable is probably located at any position within a maximum state variable interval in the Monte Carlo simulation, and a maximum radius of a state variable interval corresponding to a deterministic state variable $x_1$ is $\Delta X_1^{max}$, there is a constraint $X_1^{min} \leq [x_1 - 2\Delta X_1^{max}, x_1 + 2\Delta X_1^{max}] \leq X_1^{max}$ to ensure that the $X_1$ meets a constraint in the compact model; and therefore, defining an absolute security limit, comprising:

$$AX_1^{min} = X_1^{min} + 2\Delta X_1^{max}$$

$$AX_1^{max} = X_1^{min} + 2\Delta X_1^{max}$$

because the absolute security limit represents a security boundary in a worst-case scenario and is conservative, introducing an average position ratio $k^I$ to correct a security limit to reduce conservatism of the security limit:

$$k^I = \frac{x_0 - \underline{X_0}}{\overline{X_0} - \underline{X_0}}$$

wherein $x_0$ represents a deterministic state variable when the vector of control variables u is in $u_0 = (u^{min} + u^{max})/2$ and a scenario $\xi$ is in $\xi_0 = (h^L + h^U)/2$; $\underline{X_0}$ and $\overline{X_0}$ respectively represent a lower boundary and an upper boundary of a state variable interval obtained by solving the interval power flow equation $h(X,u) = [h^L, h^U]$ at the $u_0=(u^{min}+u^{max})/2$; and assuming that a corresponding average position ratio of the $X_1$ is $k_1'$, and $0 \leq k_1' \leq 1$, a corrected security limit is represented by a following relational expression:

$$MX_1^{min}=X_1^{min}+2k_1'\Delta X_1^{max}$$

$$MX_1^{max}=X_1^{max}+2(1-k_1')\Delta X_1^{max}$$

because the average position ratio $k'$ is defined at a midpoint of the control variable, while the control variable takes any value within a control variable interval, resulting in deviation of the X from $[\underline{X}_0, \overline{X}^0]$, there is a security error in the corrected security limit, and the state variable may exceed a limit; therefore, precisely correcting the state variable by taking an amplitude of the state variable $X_1$ exceeding an upper limit as $\delta_u X_1$ and an amplitude of the state variable $X_1$ exceeding a lower limit as $\delta_l X_1$ comprising:

$$MX_1^{min}=MX_1^{min}+\delta_l X_1$$

$$MX_1^{max}=MX_1^{max}+\delta_u X_1$$

when a precisely corrected state variable is still in an out-of-limit state, precisely correcting the precisely corrected state variable until a corrected state variable does not exceed the limit, and obtaining a final security limit; and converting the compact model into the second model based on the final security limit, wherein the second model is represented by a following relational expression:

$$\min f(x,u)$$

$$\text{s.t.} \begin{cases} h(x, u) = \xi \\ MX_1^{min} \leq x_1 \leq MX_1^{max} \\ u^{min} \leq u \leq u^{max} \end{cases}$$

wherein $\xi$ represents any scenario in the $[h^L, h^U]$.

6. The reactive power optimization method for the power system based on the distributed interval optimization according to claim 5, wherein the S4 comprises:

solving the second model by using the primal-dual interior point method;

for the second model, introducing a Lagrange multiplier $\lambda$ and dual variables $v_1$, $v_2$, $\eta_1$, and $\eta_2$ to construct a Lagrange function L that is represented by a following relational expression:

$$L(x,u,\lambda,v_1,v_2,\eta_1,\eta_2)=f(x,u)+\lambda^T(h(x,u)-\xi)+v_1^T(x_1-MX_1^{min})+v_2^T(MX_1^{max}-x_1)+\eta_1^T(u-u^{min})+\eta_2^T(u^{max}-u)$$

establishing a Karush-Kuhn-Tucker (KKT) condition for the Lagrange function, wherein the KKT condition comprises a gradient condition, a primal feasibility condition, a dual feasibility condition, and a complementary relaxation condition, and is represented by a following relational expression:

$$\begin{cases} \nabla_x L(x, u, \lambda, v_1, v_2) = \nabla_x f(x, u) + \lambda^T \nabla_x h(x, u) + v_1^T - v_2^T = 0 \\ \nabla_u L(x, u, \lambda, \eta_1, \eta_2) = \nabla_u f(x, u) + \lambda^T \nabla_u h(x, u) + \eta_1^T - \eta_2^T = 0 \\ \nabla_\lambda L(x, u, \lambda) = h(x, u) - \xi = 0 \\ MX_1^{min} \leq x_1 \leq MX_1^{max} \\ u^{min} \leq u \leq u^{max} \\ v_1, v_2, \eta_1, \eta_2 \geq 0 \\ v_1^T(x_1 - MX_1^{min}) = 0 \\ v_2^T(MX_1^{max} - x_1) = 0 \\ \eta_1^T(u - u^{min}) = 0 \\ \eta_2^T(u^{max} - u) = 0 \end{cases}$$

solving the KKT condition through Newton gradient descent, comprising:

selecting an initial point $(x_0, u_0, \lambda_0, v_1^0, v_2^0, \eta_1^0, \eta_2^0)$ to ensure that the inequality constraint is met; and in a $k^{th}$ iteration, obtaining a Newton gradient descent equation based on current $(x_k, u_k, \lambda_k, v_1^k, v_2^k, \eta_1^k, \eta_2^k)$, wherein the Newton gradient descent equation is represented by a following relational expression:

$$H\Delta z=-\nabla L(z_k)$$

wherein HI represents a Hessian matrix of the Lagrange function; $\Delta z$ represents a Newton step, comprising $\Delta x$, $\Delta u$, $\Delta \lambda$, $\Delta v_1$, $\Delta v_2$, $\Delta \eta_1$ and $\Delta \eta_2$; $\nabla L(z_k)$ represents a current gradient; and $\alpha$ is set as a step size, and a Newton step variable updating scheme is obtained and represented by a following relational expression:

$$z_{k+1}=z_k+\alpha \Delta z$$

wherein $z_k$ represents a vector constituted by a variable in the $k^{th}$ iteration, comprising $x_k, u_k, \lambda_k, v_1^k, v_2^k, \eta_1^k, \eta_2^k$; and $z_{k+1}$ represents a variable vector in a $(k+1)^{th}$ iteration, comprising $x_{k+1}, u_{k+1}, \lambda_{k+1}, v_1^{k+1}, v_2^{k+1}, \eta_1^{k+1}, \eta_2^{k+1}$; and determining whether a convergence condition is met, and when the convergence condition is met, determining that the Newton gradient descent converges, stopping an iteration, and outputting a solving result $(x^*, u^*, \lambda^*, v_1^*, v_2^*, \eta_1^*, \eta_2^*)$ of the second model, that is, obtaining the voltage and reactive power control strategy, wherein the convergence condition comprises that a duality gap Duality Gap=$v_1(x_1-MX_1^{min})+v_2(MX_1^{max}-x_1)+\eta_1(u-u^{min})+\eta_2(u^{max}-u)$ is less than a convergence tolerance, and the primal feasibility condition, the dual feasibility condition, and the complementary relaxation condition are all met.

7. The reactive power optimization method for the power system based on the distributed interval optimization according to claim 6, further comprising:

calculating a distributed interval power flow based on the voltage and reactive power control strategy, and obtaining a vector of control variables u* and a corresponding second state variable interval X*, comprising:

obtaining a distributed interval power flow model under the vector of control variables u* based on the vector of control variables u*, wherein the vector of control variables u* in the voltage and reactive power control strategy, namely, the solving result $(x^*, u^*, \lambda^*, v_1^*, v_2^*, \eta_1^*, \eta_2^*)$, comprises a final transformer transformation ratio $T_l^*$, a generator terminal voltage $V_i^*$ ($i \in S_G$), and the reactive power compensation capacity $Q_{Ci}^*$; and the distributed interval power flow model is represented by a following relational expression:

$$\min(\max) V_i, \theta_i, Q_{Gi}$$

$$\text{s.t.} \begin{cases} P_{Gi}^L \leq P_{Li} + V_i^* \sum_{j \in S} V_j \left( G_{ij}^* \cos\theta_{ij} + B_{ij}^* \sin\theta_{ij} \right) \leq P_{Gi}^U, i \in S_G \\ P_{Li}^L \leq -V_i \sum_{j \in S} V_j \left( G_{ij}^* \cos\theta_{ij} + B_{ij}^* \sin\theta_{ij} \right) \leq P_{Li}^U, i \in S_L \\ Q_{Li}^L \leq Q_{Ci}^* - V_i \sum_{j \in S} V_j \left( G_{ij}^* \sin\theta_{ij} - B_{ij}^* \cos\theta_{ij} \right) \leq Q_{Li}^U, i \in S_L \\ Q_{Gi} \leq Q_{Li} + V_i^* \sum_{j \in S} V_j \left( G_{ij}^* \sin\theta_{ij} - B_{ij}^* \cos\theta_{ij} \right) \leq 0, i \in S_G \\ V_i = V_i^0 + \sum_{j=2}^{n} V_{i,j}^P \varepsilon_{j1}^P + \sum_{j=r+2}^{n} V_{i,j}^Q \varepsilon_{j1}^Q, i \in S_L \\ \theta_i = \theta_i^0 + \sum_{j=2}^{n} \theta_{i,j}^P \varepsilon_{j2}^P + \sum_{j=r+2}^{n} \theta_{i,j}^Q \varepsilon_{j2}^Q, i \in S_G \cup S_L \\ Q_{Gi} = Q_{Gi}^0 + \sum_{j=2}^{n} Q_{Gi,j}^P \varepsilon_{j3}^P + \sum_{j=r+2}^{n} Q_{Gi,j}^Q \varepsilon_{j3}^Q, i \in S_G \\ -1 \leq \varepsilon_{jx}^P, \varepsilon_{jx}^Q \leq 1, x \in (1, 2, 3) \end{cases}$$

wherein $G_{ij}^*$ and $B_{ij}^*$ respectively represent a real part and an imaginary part of a bus admittance matrix under the final transformer transformation ratio $T_l^*$; and obtaining the corresponding second state variable interval $X^*$ of the power system under the $u^*$ through solving based on the distributed interval power flow model under the $u^*$ and the distributed interval power flow algorithm, wherein the $X^*$ comprises a voltage interval $V_i^*$ of the load bus, a phase angle interval $\theta_i^*$ of the bus voltage, and a reactive power generation interval $Q_{Gi}^*$ of the generator; and outputting the $u^*$ and the $X^*$, in other words, obtaining the vector of control variables and the corresponding second state variable interval.

8. A computer medium, comprising a processor, a memory, and a computer program for implementing the reactive power optimization method according to claim 1.

9. The computer medium according to claim 8, wherein in the reactive power optimization method, the constraint of the interval power flow equation comprises:

$$\text{s.t.} \begin{cases} \hat{P}_{Gi} - P_{Li} - V_i \sum_{j \in S} V_j (G_{ij} \cos\theta_{ij} + B_{ij} \sin\theta_{ij}) = 0, i \in S_G \\ P_{Gi} - P_{Li} - V_i \sum_{j \in S} V_j (G_{ij} \cos\theta_{ij} + B_{ij} \sin\theta_{ij}) = 0, i \in S_{Gs} \\ Q_{Gi} - Q_{Li} - V_i \sum_{j \in S} V_j (G_{ij} \sin\theta_{ij} - B_{ij} \cos\theta_{ij}) = 0, i \in S_G \cup S_{Gs} \\ -\hat{P}_{Li} - V_i \sum_{j \in S} V_j (G_{ij} \cos\theta_{ij} + B_{ij} \sin\theta_{ij}) = 0, i \in S_L \\ Q_{Ci} - \hat{Q}_{Li} - V_i \sum_{j \in S} V_j (G_{ij} \sin\theta_{ij} - B_{ij} \cos\theta_{ij}) = 0, i \in S_L \\ \theta_{ij} = \theta_i - \theta_j \end{cases}$$

wherein $B_{ij}$ represents an imaginary part of the power system bus admittance matrix; $\hat{P}_{Gi}$ represents the active power generation interval val $\hat{P}_{Gi} = [P_{Gi}^L, P_{Gi}^U]$ of the renewable energy unit; $P_{Gi}^L$ and $P_{Gi}^U$ respectively represent the lower boundary and the upper boundary of the active power generation interval of the renewable energy unit; $S_G$ represents the generator bus excluding the slack bus; $S_{Gs}$ represents the slack bus, wherein the power system comprises one slack bus; when $i \in S_{Gs}$, $P_{Li}$ represents the active load of the generator bus excluding the slack bus; when $i \in S_{Gs}$, $P_{Li}$ represents an active load of the slack bus; $P_{Gi}$ represents an active power generation of a slack bus; when $i \in S_G$, $Q_{Gi}$ and $Q_{Li}$ respectively represent the reactive power generation and the reactive load of the generator bus excluding the slack bus; when $i \in S_{Gs}$, $Q_{Gi}$ and $Q_{Li}$ respectively represent a reactive power generation and a reactive load of the slack bus; the active load and the reactive load of the slack bus, as well as the active load and the reactive load of the generator bus are deterministic data; $\hat{P}_{Li}$ and $\hat{Q}_{Li}$ respectively represent an active load interval $\hat{P}_{Li} = [P_{Li}^L, P_{Li}^U]$ and a reactive load interval $\hat{Q}_{Li} = [Q_{Li}^L, Q_{Li}^U]$ of a load bus i, $P_{Li}^L$ and $P_{Li}^U$ respectively represent the lower boundary and the upper boundary of the active load interval of the load bus; $Q_{Li}^L$ and $Q_{Li}^U$ respectively represent the lower boundary and the upper boundary of the reactive load interval of the load bus; $S_L$ represents the load bus; and $Q_{Ci}$ represents the reactive power compensation capacity of the bus i.

10. The computer medium according to claim 9, wherein in the reactive power optimization method, the first constraint comprises:

$$\text{s.t.} \begin{cases} V_i^{min} \leq V_i \leq V_i^{max}, i \in S_G \cup S_L \\ P_{Gi}^{min} \leq P_{Gi} \leq P_{Gi}^{max}, i \in S_{Gs} \\ Q_{Gi}^{min} \leq Q_{Gi} \leq Q_{Gi}^{max}, i \in S_G \cup S_{Gs} \\ T_l^{min} \leq T_l \leq T_l^{max}, l \in S_T \\ Q_{Ci}^{min} \leq Q_{Ci} \leq Q_{Ci}^{max}, i \in S_C \end{cases}$$

wherein $V_i^{min}$ and $V_i^{max}$ respectively represent a lower limit and an upper limit of an i amplitude of a bus voltage; $P_{Gi}^{min}$ and $P_{Gi}^{max}$ respectively represent a lower limit and an upper limit of the active power generation of the slack bus; when $i \in S_G$, $Q_{Gi}^{min}$ and $Q_{Gi}^{max}$ respectively represent a lower limit and an upper limit of the reactive power generation of the generator bus excluding the slack bus; when $i \in S_{Gs}$, $Q_{Gi}^{min}$ and $Q_{Gi}^{max}$ respectively represent a lower limit and an upper limit of the reactive power generation of the slack bus; $T_l$ represents a transformer transformation ratio; $T_l^{min}$ and $T_l^{max}$ respectively represent a lower limit and an upper limit of the transformer transformation ratio; $S_T$ represents a transformer branch; $Q_{Ci}^{min}$ and $Q_{Ci}^{max}$ respectively represent a lower limit and an upper limit of the reactive power compensation capacity; and $S_C$ represents a reactive power compensation bus.

11. The computer medium according to claim 10, wherein the reactive power optimization method further comprises: solving the sensitivity coefficients, comprising:

$$V_{i,j}^P = \left.\frac{\partial V_i}{\partial P_j}\right|_0 \Delta P_j, \theta_{i,j}^P = \left.\frac{\partial \theta_i}{\partial P_j}\right|_0 \Delta P_j, Q_{Gi,j}^P = \left.\frac{\partial Q_{Gi}}{\partial P_j}\right|_0 \Delta P_j, j \in S_G \cup S_L$$

$$V_{i,j}^Q = \left.\frac{\partial V_i}{\partial Q_j}\right|_0 \Delta Q_j, \theta_{i,j}^Q = \left.\frac{\partial \theta_i}{\partial Q_j}\right|_0 \Delta Q_j, Q_{Gi,j}^Q = \left.\frac{\partial Q_{Gi}}{\partial Q_j}\right|_0 \Delta Q_j, j \in S_L$$

wherein $$\left.\frac{\partial V_i}{\partial P_j}\right|_0, \left.\frac{\partial V_i}{\partial Q_j}\right|_0, \left.\frac{\partial \theta_i}{\partial P_j}\right|_0, \left.\frac{\partial \theta_i}{\partial Q_j}\right|_0, \left.\frac{\partial Q_{Gi}}{\partial P_j}\right|_0, \text{and} \left.\frac{\partial Q_{Gi}}{\partial Q_j}\right|_0$$

respectively represent partial derivatives of all variables at a value 0, and are obtained at a power flow solution at the midpoint of the power injection interval; $\Delta P_j$ and $\Delta Q_j$ respectively represent radii of an active power injection interval and a reactive power injection interval, wherein $\Delta P_j=(P_{Gj}^U-P_{Gj}^L)/2$, $j \in S_G$, and $P_{Gj}^U$ and $P_{Gj}^L$ respectively represent an upper limit and a lower limit of an active power generation interval of the generator bus; $\Delta P_j=(P_{Lj}^U-P_{Lj}^L)/2$, $j \in S1$, wherein $P_{Li}^U$ and $P_{Li}^L$ respectively represent an upper limit and a lower limit of an active load demand interval of the load bus; and $\Delta Q_j=(Q_{Lj}^U-Q_{Lj}^L)/2$, $j \in S_L$, wherein $Q_{Lj}^U$ and $Q_{Lj}^L$ respectively represent an upper limit and a lower limit of a reactive load demand interval of the load bus.

12. The computer medium according to claim 11, wherein in the reactive power optimization method, the S3 comprises:

since each inequality constraint in the first model is a univariate constraint, representing a variable, an objective function, and a constraint in the first model by using a vector and a function, and representing the first model as a compact model:

$$\min f(X,u)=[f^L,f^U]$$

$$\text{s.t.} \begin{cases} h(X,u) = [h^L, h^U] \\ X_1^{min} \le X_1 \le X_1^{max} \\ u^{min} \le u \le u^{max} \end{cases}$$

wherein $f(X,u)$ represents the network loss of the power system; $[f_L, f^U]$ represents an interval form of the network loss; $h(X,u)$ represents the constraint of the interval power flow equation; $[h^L,h^U]$ represents a vector of power injection intervals of buses; X represents the first state variable interval; u represents a vector of control variables; $X_1$ represents a vector constituted by a voltage of the load bus and a reactive power generation of a generator, wherein $X_1^{min}$ and $X_1^{max}$ respectively represent a minimum value and a maximum value of the $X_1$, and $u^{min}$ and $u^{max}$ respectively represent a minimum value and a maximum value of the vector of control variables u; T represents transposition; and when a voltage phase angle of a bus other than the slack bus and an active power generation of the slack bus are represented as a vector $X_2$, a vector of state variables of the power system is represented as $X=[X_1^T, X_2^T]^T$;

in the compact model, for any vector of control variables u, solving the interval power flow equation $h(X,u)=[h^L, h^U]$ based on the distributed interval power flow algorithm, and obtaining the corresponding X, wherein due to a boundary of the u, there is a vector of control variables $u^i$ that maximizes an interval radius of one $X_i$ of the x, which is denoted as $X_i^{max}$, and each $X_i^{max}$ has one corresponding $u^i$; and therefore, defining a maximum radius $\Delta X_i^{max}$ of the $X_i$:

$$\Delta X_i^{max} = \max_{u^{min} \le u \le u^{max}} \{\Delta X_i | h(X, u) = [h^L, h^U]\}$$

wherein $\Delta X_i$ represents an interval radius of the state variable $X_i$;

obtaining a vector $\Delta X_1^{max}$ constituted by maximum interval radii of all variables in $X_1$ through Monte Carlo simulation, wherein for a same vector of control variables u, the X represents a solution of the interval power flow equation $h(X,u)=[h^L, h^U]$, x represents a solution of a deterministic power flow equation $h(X, u)=\xi$, $\xi \in [h^L,h^U]$, and considering that a deterministic state variable is probably located at any position within a maximum state variable interval in the Monte Carlo simulation, and a maximum radius of a state variable interval corresponding to a deterministic state variable $x_1$ is $\Delta X_1^{max}$, there is a constraint $X_1^{min} \le [x_1-2\Delta X_1^{max}, x_1+2\Delta X_1^{max}] \le X_1^{max}$ to ensure that the $X_1$ meets a constraint in the compact model; and therefore, defining an absolute security limit, comprising:

$$AX_1^{min}=X_1^{min}+2\Delta X_1^{max}$$

$$AX_1^{max}=X_1^{min}+2\Delta X_1^{max}$$

because the absolute security limit represents a security boundary in a worst-case scenario and is conservative, introducing an average position ratio $k^I$ to correct a security limit to reduce conservatism of the security limit:

$$k^I = \frac{x_0 - \underline{X_0}}{\overline{X_0} - \underline{X_0}}$$

wherein $x_0$ represents a deterministic state variable when the vector of control variables u is in $u_0=(u^{min}+u^{max})/2$ and a scenario $\xi$ is in $\xi_0=(h^L+h^U)/2$; $\underline{X_0}$ and $\overline{X_0}$ respectively represent a lower boundary and an upper boundary of a state variable interval obtained by solving the interval power flow equation $h(X,u)=[h^L, h^U]$ at the $u_0=(u^{min}+u^{max})/2$; and assuming that a corresponding average position ratio of the $X_1$ is $k_1^I$, and $0 \le k_1^I \le 1$, a corrected security limit is represented by a following relational expression:

$$MX_1^{min}=X_1^{min}+2k_1^I\Delta X_1^{max}$$

$$MX_1^{max}=X_1^{max}+2(1-k_1^I)\Delta X_1^{max}$$

because the average position ratio $k^I$ is defined at a midpoint of the control variable, while the control variable takes any value within a control variable interval, resulting in deviation of the X from $[\underline{X_0}, \overline{X^0}]$, there is a security error in the corrected security limit, and the state variable may exceed a limit; therefore, precisely correcting the state variable by taking an amplitude of the state variable $X_1$ exceeding an upper limit as $\delta_u X_1$ and an amplitude of the state variable $X_1$ exceeding a lower limit as $\delta_l X_1$, comprising:

$$MX_1^{min}=MX_1^{min}+\delta_l X_1$$

$$MX_1^{max}=MX_1^{max}+\delta_u X_1$$

when a precisely corrected state variable is still in an out-of-limit state, precisely correcting the precisely corrected state variable until a corrected state variable does not exceed the limit, and obtaining a final security limit; and converting the compact model into the second model based on the final security limit, wherein the second model is represented by a following relational expression:

$$\min f(x,u)$$

$$\text{s.t.} \begin{cases} h(x, u) = \xi \\ MX_1^{min} \le x_1 \le MX_1^{max} \\ u^{min} \le u \le u^{max} \end{cases}$$

wherein $\xi$ represents any scenario in the $[h^L, h^U]$.

13. The computer medium according to claim 12, wherein in the reactive power optimization method, the S4 comprises:

solving the second model by using the primal-dual interior point method;

for the second model, introducing a Lagrange multiplier $\lambda$ and dual variables $v_1$, $v_2$, $\eta_1$, and $\eta_2$ to construct a Lagrange function L that is represented by a following relational expression:

$$L(x,u,\lambda,v_1,v_2,\eta_1,\eta_2) = f(x,u) + \lambda^T(h(x,u) - \xi) + v_1^T(x_1 - MX_1^{min}) + v_2^T(MX_1^{max} - x_1) + \eta_1^T(u - u^{min}) + \eta_2^T(u^{max} - u)$$

establishing a Karush-Kuhn-Tucker (KKT) condition for the Lagrange function, wherein the KKT condition comprises a gradient condition, a primal feasibility condition, a dual feasibility condition, and a complementary relaxation condition, and is represented by a following relational expression:

$$\begin{cases} \nabla_x L(x, u, \lambda, v_1, v_2) = \nabla_x f(x, u) + \lambda^T \nabla_x h(x, u) + v_1^T - v_2^T = 0 \\ \nabla_u L(x, u, \lambda, \eta_1, \eta_2) = \nabla_u f(x, u) + \lambda^T \nabla_u h(x, u) + \eta_1^T - \eta_2^T = 0 \\ \nabla_\lambda L(x, u, \lambda) = h(x, u) - \xi = 0 \\ MX_1^{min} \le x_1 \le MX_1^{max} \\ u^{min} \le u \le u^{max} \\ v_1, v_2, \eta_1, \eta_2 \ge 0 \\ v_1^T(x_1 - MX_1^{min}) = 0 \\ v_2^T(MX_1^{max} - x_1) = 0 \\ \eta_1^T(u - u^{min}) = 0 \\ \eta_2^T(u^{max} - u) = 0 \end{cases}$$

solving the KKT condition through Newton gradient descent, comprising:

selecting an initial point $(x_0, u_0, \lambda_0, v_1^0, v_2^0, \eta_1^0, \eta_2^0)$ to ensure that the inequality constraint is met; and in a $k^{th}$ iteration, obtaining a Newton gradient descent equation based on current $(x_k, u_k, \lambda_k, v_1^k, v_2^k, \eta_1^k, \eta_2^k)$, wherein the Newton gradient descent equation is represented by a following relational expression:

$$H\Delta z = -\nabla L(z_k)$$

wherein H represents a Hessian matrix of the Lagrange function; $\Delta z$ represents a Newton step, comprising $\Delta x$, $\Delta u$, $\Delta\lambda$, $\Delta v_1$, $\Delta v_2$, $\Delta\eta_1$ and $\Delta\eta_2$; $\nabla L(z_k)$ represents a current gradient; and $\alpha$ is set as a step size, and a Newton step variable updating scheme is obtained and represented by a following relational expression:

$$z_{k+1} = z_K + \alpha \Delta z$$

wherein $z_k$ represents a vector constituted by a variable in the $k^{th}$ iteration, comprising $x_k, u_k, \lambda_k, v_1^k, v_2^k, \eta_1^k, \eta_2^k$; and $z_{k+1}$ represents a variable vector in a $(k+1)^{th}$ iteration, comprising $x_{k+1}, u_{k+1}, \lambda_{k+1}, v_1^{k+1}, v_2^{k+1}, \eta_1^{k+1}, \eta_2^{k+1}$; and determining whether a convergence condition is met, and when the convergence condition is met, determining that the Newton gradient descent converges, stopping an iteration, and outputting a solving result $(x^*, u^*, \lambda^*, v_1^*, v_2^*, \eta_1^*, \eta_2^*)$ of the second model, that is, obtaining the voltage and reactive power control strategy, wherein the convergence condition comprises that a duality gap Duality Gap = $v_1(x_1 - MX_1^{min}) + v_2(MX_1^{max} - x_1) + \eta_1(u - u^{min}) + \eta_2(u^{max} - u)$ is less than a convergence tolerance, and the primal feasibility condition, the dual feasibility condition, and the complementary relaxation condition are all met.

14. The computer medium according to claim 13, wherein the reactive power optimization method further comprises:

calculating a distributed interval power flow based on the voltage and reactive power control strategy, and obtaining a vector of control variables u* and a corresponding second state variable interval X*, comprising:

obtaining a distributed interval power flow model under the vector of control variables u* based on the vector of control variables u*, wherein the vector of control variables u* in the voltage and reactive power control strategy, namely, the solving result $(x^*, u^*, \lambda^*, v_1^*, v_2^*, \eta_1^*, \eta_2^*)$, comprises a final transformer transformation ratio $T_l^*$, a generator terminal voltage $V_i^*$ ($i \in S_G$), and the reactive power compensation capacity $Q_{Ci}^*$; and the distributed interval power flow model is represented by a following relational expression:

$$\min(\max) V_i, \theta_i, Q_{Gi}$$

$$\text{s.t.} \begin{cases} P_{Gi}^L \le P_{Li} + V_i^* \sum_{j \in S} V_j(G_{ij}^* \cos\theta_{ij} + B_{ij}^* \sin\theta_{ij}) \le P_{Gi}^U, i \in S_G \\ P_{Li}^L \le -V_i \sum_{j \in S} V_j(G_{ij}^* \cos\theta_{ij} + B_{ij}^* \sin\theta_{ij}) \le P_{Li}^U, i \in S_L \\ Q_{Li}^L \le Q_{Ci}^* - V_i \sum_{j \in S} V_j(G_{ij}^* \sin\theta_{ij} - B_{ij}^* \cos\theta_{ij}) \le Q_{Li}^U, i \in S_L \\ Q_{Gi} - Q_{Li} - V_i^* \sum_{j \in S} V_j(G_{ij}^* \sin\theta_{ij} - B_{ij}^* \cos\theta_{ij}) = 0, i \in S_G \\ V_i = V_i^0 + \sum_{j=2}^{n} V_{i,j}^P \varepsilon_{j1}^P + \sum_{j=r+2}^{n} V_{i,j}^Q \varepsilon_{j1}^Q, i \in S_L \\ \theta_i = \theta_i^0 + \sum_{j=2}^{n} \theta_{i,j}^P \varepsilon_{j2}^P + \sum_{j=r+2}^{n} \theta_{i,j}^Q \varepsilon_{j2}^Q, i \in S_G \cup S_L \\ Q_{Gi} = Q_{Gi}^0 + \sum_{j=2}^{n} Q_{Gi,j}^P \varepsilon_{j3}^P + \sum_{j=r+2}^{n} Q_{Gi,j}^Q \varepsilon_{j3}^Q, i \in S_G \\ -1 \le \varepsilon_{jx}^P, \varepsilon_{jx}^Q \le 1, x \in (1, 2, 3) \end{cases}$$

wherein $G_{ij}^*$ and $B_{ij}^*$ respectively represent a real part and an imaginary part of a bus admittance matrix under the final transformer transformation ratio $T_l^*$; and obtaining the corresponding second state variable interval X* of the power system under the u* through solving based on the distributed interval power flow model under the u* and the distributed interval power flow algorithm, wherein the X* comprises a voltage interval $V_i^*$ of the load bus, a phase angle interval $\theta_i^*$ of the bus voltage, and a reactive power generation interval $Q_{Gi}^*$ of the generator; and outputting the u* and the X*, in other words, obtaining the vector of control variables and the corresponding second state variable interval.

* * * * *